United States Patent [19]
Itoh et al.

[11] Patent Number: 5,335,029
[45] Date of Patent: Aug. 2, 1994

[54] MAGNETIC RECORDING SYSTEM FOR CAMERA USING FILM WITH MAGNETIC RECORDING PORTION

[75] Inventors: Junichi Itoh; Masahiro Dai; Yasushi Toizumi; Kazunori Mizokami; Yoji Watanabe; Ayumu Midorikawa, all of Tokyo, Japan

[73] Assignee: Olympus Optical Co., Ltd., Tokyo, Japan

[21] Appl. No.: 80,317

[22] Filed: Jun. 22, 1993

[30] Foreign Application Priority Data

Jun. 26, 1992 [JP] Japan ................................. 4-169687
Sep. 14, 1992 [JP] Japan ................................. 4-244961

[51] Int. Cl.$^5$ ........................ G03B 17/24; G03B 1/00
[52] U.S. Cl. ..................................... 354/106; 354/214
[58] Field of Search ................. 354/76, 105, 106, 75, 354/173.1, 214

[56] References Cited
U.S. PATENT DOCUMENTS

| | | | |
|---|---|---|---|
| 5,130,728 | 7/1992 | Goto et al. | 354/105 |
| 5,184,161 | 2/1993 | Egawa | 354/105 |
| 5,187,511 | 2/1993 | Amano | 354/106 |
| 5,204,708 | 4/1993 | Whitfield et al. | 354/105 |
| 5,220,367 | 6/1993 | Matsuyama | 354/105 |

FOREIGN PATENT DOCUMENTS 3-223737 10/1991 Japan .

Primary Examiner—Michael L. Gellner
Assistant Examiner—Jae N. Noh
Attorney, Agent, or Firm—Frishauf, Holtz, Goodman & Woodward

[57] ABSTRACT

In a magnetic recording apparatus for a camera using a film having a magnetic recording portion, a magnetic recording device records photographic data on the magnetic recording portion while the film is wound after a photographic operation corresponding to one frame is completed. An electrically erasable nonvolatile storage device stores the photographic data after the photographic operation corresponding to one frame is completed. A magnetic reproducing device reproduces the photographic data recorded on the magnetic recording portion while the film is rewound. A determining device determines whether the photographic data reproduced by the magnetic reproducing device coincides with the photographic data stored in the storage device. When the determining device determines that the two photographic data do not coincide with each other, a re-recording device causes the magnetic recording device to re-record the photographic data stored in the storage device on the magnetic recording portion. An erasing device erases the magnetically recorded data when the determining device determines that the two photographic data do not coincide with each other.

48 Claims, 24 Drawing Sheets

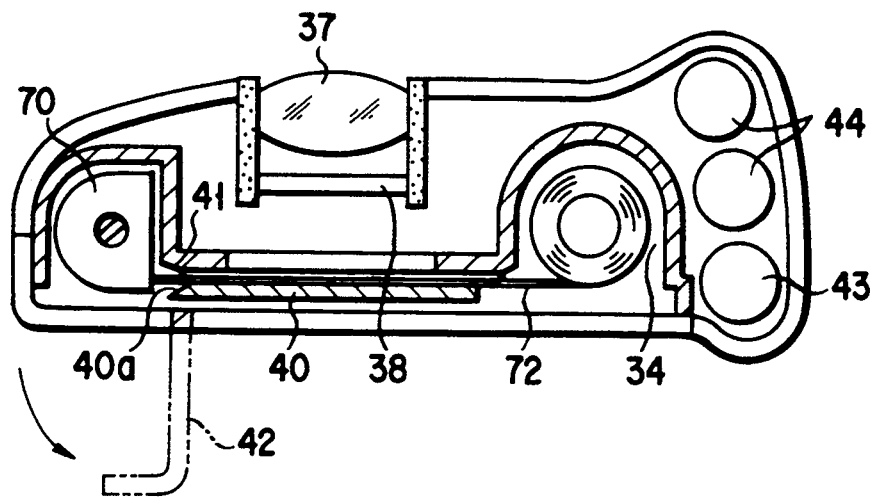
F I G. 12
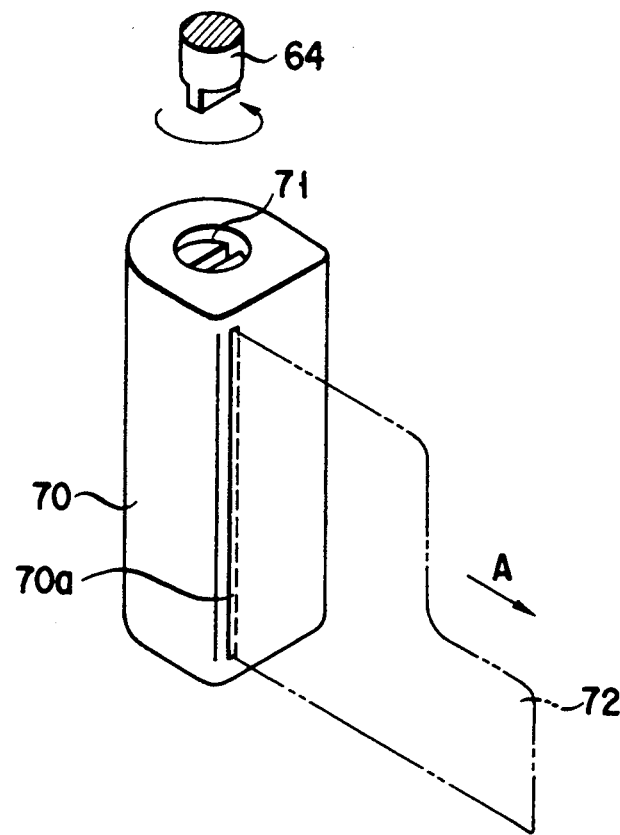
F I G. 13

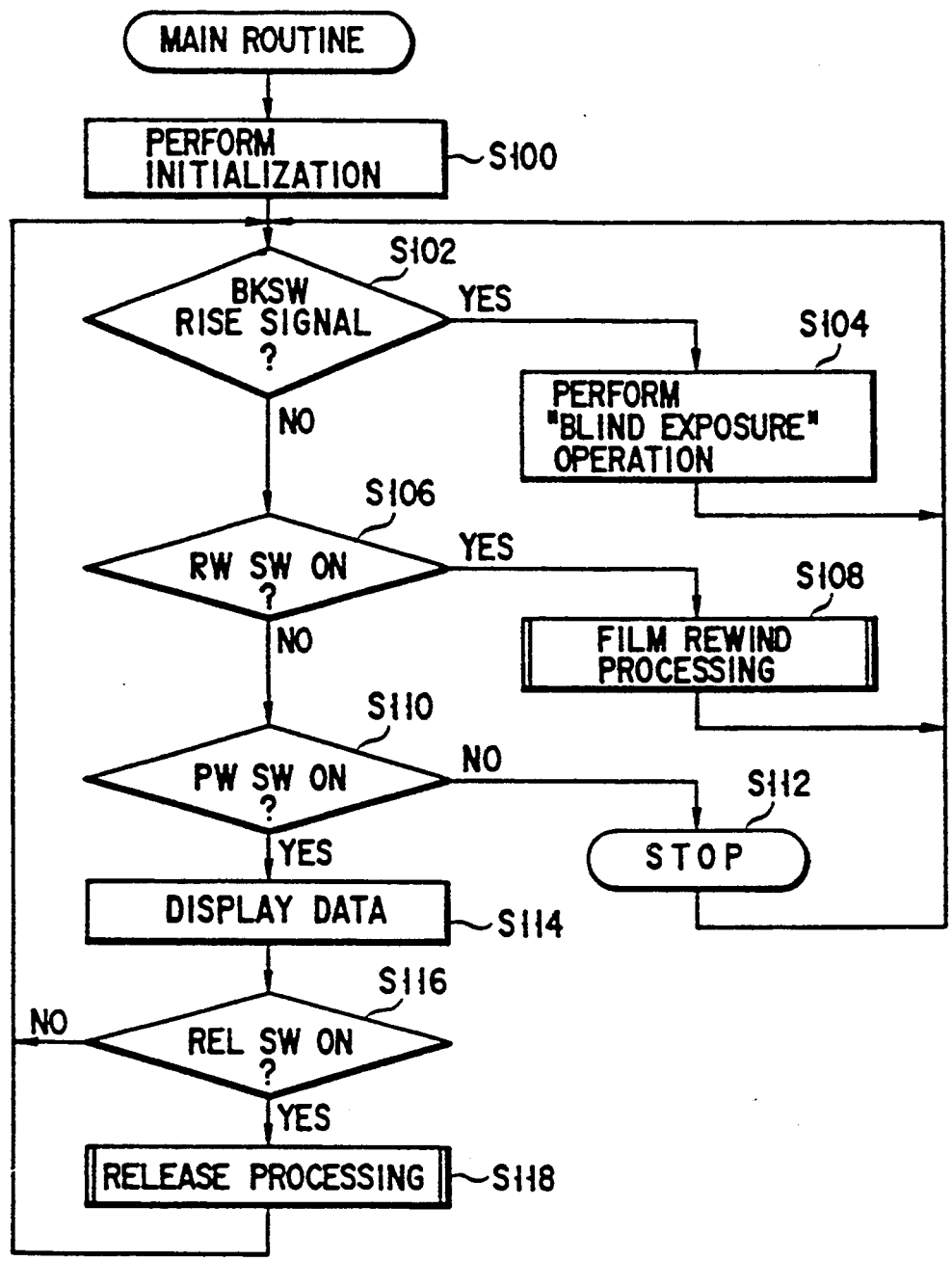
F I G. 14

| NUMBER | DATA [HEX] | CHARACTER | |
|---|---|---|---|
| 0 | 00 | | |
| ⋮ | ⋮ | ⋮ | |
| N0 | 00 | | |
| N1 | FF | | |
| N2 | 02 | | |
| N3 | 44 | D | ⎫ |
| N3+1 | 41 | A | ⎬ DATE |
| N3+2 | 54 | T | ⎪ |
| N3+3 | 45 | E | ⎭ |
| N3+4 | 35 | 5 | ⎱ 53 (MINUTE) |
| N3+5 | 33 | 3 | ⎰ |
| N3+6 | 31 | 1 | ⎱ 15 (HOUR) |
| N3+7 | 35 | 5 | ⎰ |
| N3+8 | 31 | 1 | ⎱ 15 (DAY) |
| N3+9 | 35 | 5 | ⎰ |
| N3+10 | 30 | 0 | ⎱ 04 (MONTH) |
| N3+11 | 34 | 4 | ⎰ |
| N3+12 | 39 | 9 | ⎱ 95 (YEAR) |
| N3+13 | 35 | 5 | ⎰ |
| ⋮ | ⋮ | ⋮ | |
| N4−10 | 54 | T | ⎫ |
| N4−9 | 76 | v | ⎬ Tv 7 (1/125 SEC) |
| N4−8 | 37 | 7 | ⎭ |
| N4−7 | 41 | A | ⎫ |
| N4−6 | 76 | v | ⎬ Av 4 (FNO 4.0) |
| N4−5 | 34 | 4 | ⎭ |
| N4−4 | 45 | E | ⎫ |
| N4−3 | 58 | X | ⎪ |
| N4−2 | 50 | P | ⎬ EXP 19 (19TH FRAME) |
| N4−1 | 31 | 1 | ⎪ |
| N4 | 39 | 9 | ⎭ |
| N5 | 03 | | |
| N6 | FF | | |
| N7 | 00 | | |
| ⋮ | ⋮ | ⋮ | |
| N8 | 00 | | |

F I G. 15

ANSI (ASCII)

| | 0 | 1 | 2 | 3 | 4 | 5 | 6 | 7 |
|---|---|---|---|---|---|---|---|---|
| 0 | NUL | TC7 (DLE) | SP | 0 | @ | P | ` | p |
| 1 | TC1 (SOH) | DC1 | ! | 1 | A | Q | a | q |
| 2 | TC2 (EXT) | DC2 | " | 2 | B | R | b | r |
| 3 | TC3 (EOT) | DC3 | # | 3 | C | S | c | s |
| 4 | TC4 (EOT) | DC4 | $ | 4 | D | T | d | t |
| 5 | TC5 (ENQ) | TC8 (NAK) | % | 5 | E | U | e | u |
| 6 | TC6 (ACK) | TC9 (SYN) | & | 6 | F | V | f | v |
| 7 | BEL | TC10 (ETB) | ' | 7 | G | W | g | w |
| 8 | FE0 (BS) | CAN | ( | 8 | H | X | h | x |
| 9 | FE1 (HT) | EM | ) | 9 | I | Y | i | y |
| A | FE2 (LF) | SUB | * | : | J | Z | j | z |
| B | FE3 (VT) | ESC | + | ; | K | [ | k | { |
| C | FE4 (FF) | IS4 (FS) | , | < | L | \ | l | \| |
| D | FE5 (CR) | IS3 (CS) | - | = | M | ] | m | } |
| E | SO | IS2 (RS) | . | > | N | ^ | n | ~ |
| F | SI | IS1 (US) | / | ? | O | _ | o | DEL |

FIG. 16

| ADDRESS | DATA [HEX] | CHARACTER |
|---|---|---|
| TAD 0 | 02 | |
| | 44 | D |
| | 41 | A |
| | 54 | T |
| | 55 | E |
| | 00 | |
| | 00 | |
| | 00 | |
| | 00 | |
| | 00 | |
| | 00 | |
| | 00 | |
| | 00 | |
| | 00 | |
| TAD 13 | 00 | |
| ≀ | ≀ | ≀ |
| TADn-10 | 54 | T |
| | 76 | V |
| | 00 | |
| | 41 | A |
| | 76 | V |
| | 00 | |
| | 45 | E |
| | 58 | X |
| | 50 | P |
| | 00 | |
| | 00 | |
| TADn | 03 | |

F I G. 18

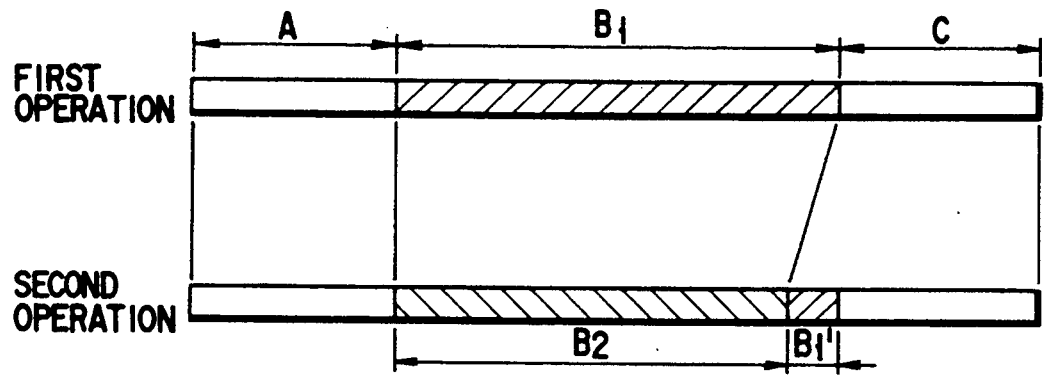
F I G. 20
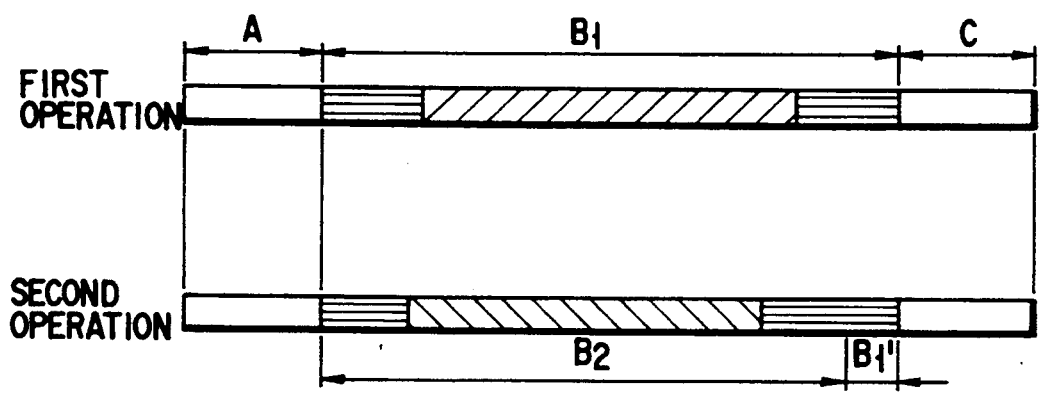
F I G. 21

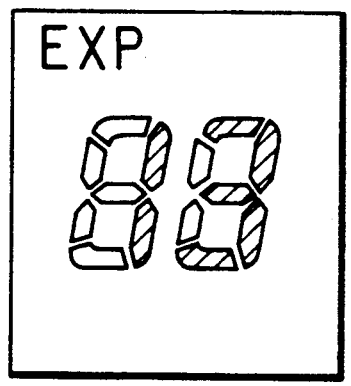 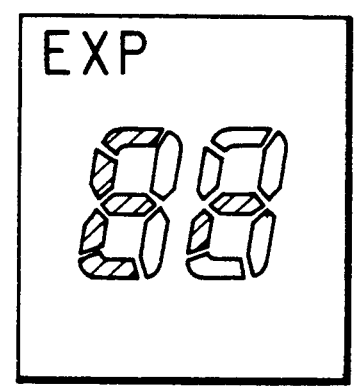
F I G. 26A    F I G. 26B

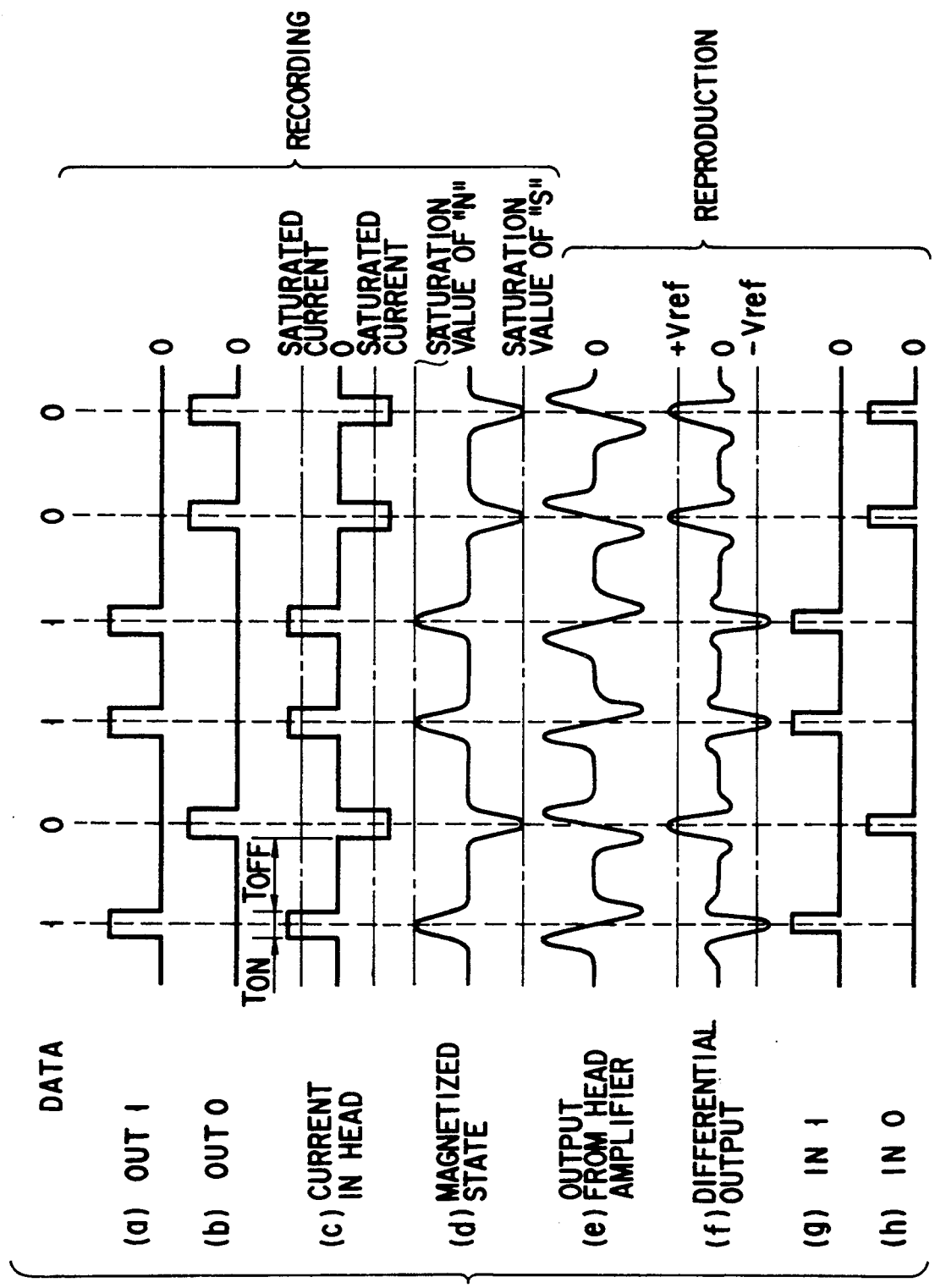
F I G. 29

MAGNETIC RECORDING SYSTEM FOR CAMERA USING FILM WITH MAGNETIC RECORDING PORTION

BACKGROUND OF THE INVENTION

1. Field of the Invention

The present invention relates to a magnetic recording system for a camera using films with magnetic recording portions and, more particularly, to a magnetic recording system for a camera using photosensitive films with magnetic recording portions on which photographic data is magnetically recorded.

2. Description of the Related Art

Recently, as a photosensitive film for a camera, a film having a magnetic recording portion (magnetic track) has been proposed. This film allows data such as photographic conditions to be recorded on the magnetic recording portion. The data is read in a developing or printing operation to perform the operation under proper conditions.

For example, Published Unexamined Japanese Patent Application No. 3-223737 discloses a camera using such a photosensitive film having a magnetic recording portion (magnetic track) for magnetically recording photographic data thereon. According to this patent application, in this camera, photographic data of each film frame is stored in a data storage means such as a RAM. The RAM data can be recorded on the magnetic track of the film during a film rewind operation after photography.

In the above-described camera, however, since magnetic recording is interlocked with a film rewind operation, whether data is accurately recorded on the magnetic track of the film cannot be checked by reproducing the data.

As a camera using a photosensitive film having such a magnetic recording portion, for example, a camera disclosed in U.S. Pat. No. 5,130,728 is known. In this camera, when a "blind exposure" operation of a film is not properly performed, incomplete data recorded on the magnetic recording portion is erased.

According to the camera disclosed in the above patent application, although data is erased upon detection of failure in a "blind exposure" operation, data is left when a "blind exposure" operation is successfully performed. If, therefore, complete data cannot be recorded because of damage to a film, incomplete data is left.

SUMMARY OF THE INVENTION

It is, therefore, an object of the present invention to provide a new and improved magnetic recording system for a camera using films with magnetic recording portions, in which whether data is accurately recorded on the magnetic recording portion of a film can be checked for each photographic operation.

In addition, the present invention has been made in consideration of the above situation, and has as another object to provide a magnetic recording system for a camera, which can prevent an erroneous developing or printing operation based on incomplete data.

According to one aspect of the present invention, there is provided a magnetic recording apparatus for a camera using a film with a magnetic recording portion, comprising: magnetic recording means for recording photographic data on a predetermined position of the magnetic recording portion when the film is wound after photography corresponding to one frame is completed; electrically erasable nonvolatile storage means for storing the photographic data after the photography corresponding to one frame is completed; magnetic reproducing means for reproducing the photographic data recorded on the magnetic recording portion while the film is rewound; determining means for determining whether the photographic data reproduced by the magnetic reproducing means coincides with the photographic data stored in the storage means; and re-recording means for causing the magnetic recording means to re-record the photographic data, stored in the storage means, on the predetermined position of the magnetic recording portion when the determining means determines that the two photographic data do not coincide with each other.

According to another aspect of the present invention, there is provided a magnetic recording apparatus for a camera using a film with a magnetic recording portion, comprising: magnetic recording means for recording photographic data on the magnetic recording portion when the film is wound after photography corresponding to one frame is completed; storage means for storing the photographic data after the photography corresponding to one frame is completed; magnetic reproducing means for reproducing the photographic data recorded on the magnetic recording portion while the film is rewound; determining means for determining whether the photographic data reproduced by the magnetic reproducing means coincides with the photographic data stored in the storage means; and erasing means for erasing recorded data when the determining means determines that the two photographic data do not coincide with each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is a horizontal sectional view of the camera;

FIG. 13 is a perspective view of the film cartridge;

FIG. 14 is a flow chart for explaining a main routine;

FIG. 15 is a view showing data to be transferred to a control IC;

FIG. 16 is a view showing a character code table based on the ASCII code;

FIG. 18 is a view for explaining a method of storing identification data;

FIG. 20 is a view showing magnetized states of a magnetic track;

FIG. 21 is a view showing other magnetized states of the magnetic track;

FIGS. 26A and 26B are views showing samples displayed by a display unit;

FIG. 29 is a timing chart for explaining the waveforms of signals at the respective components of the circuit shown in FIG. 28.

DETAILED DESCRIPTION OF THE PREFERRED EMBODIMENTS

Figure 1:
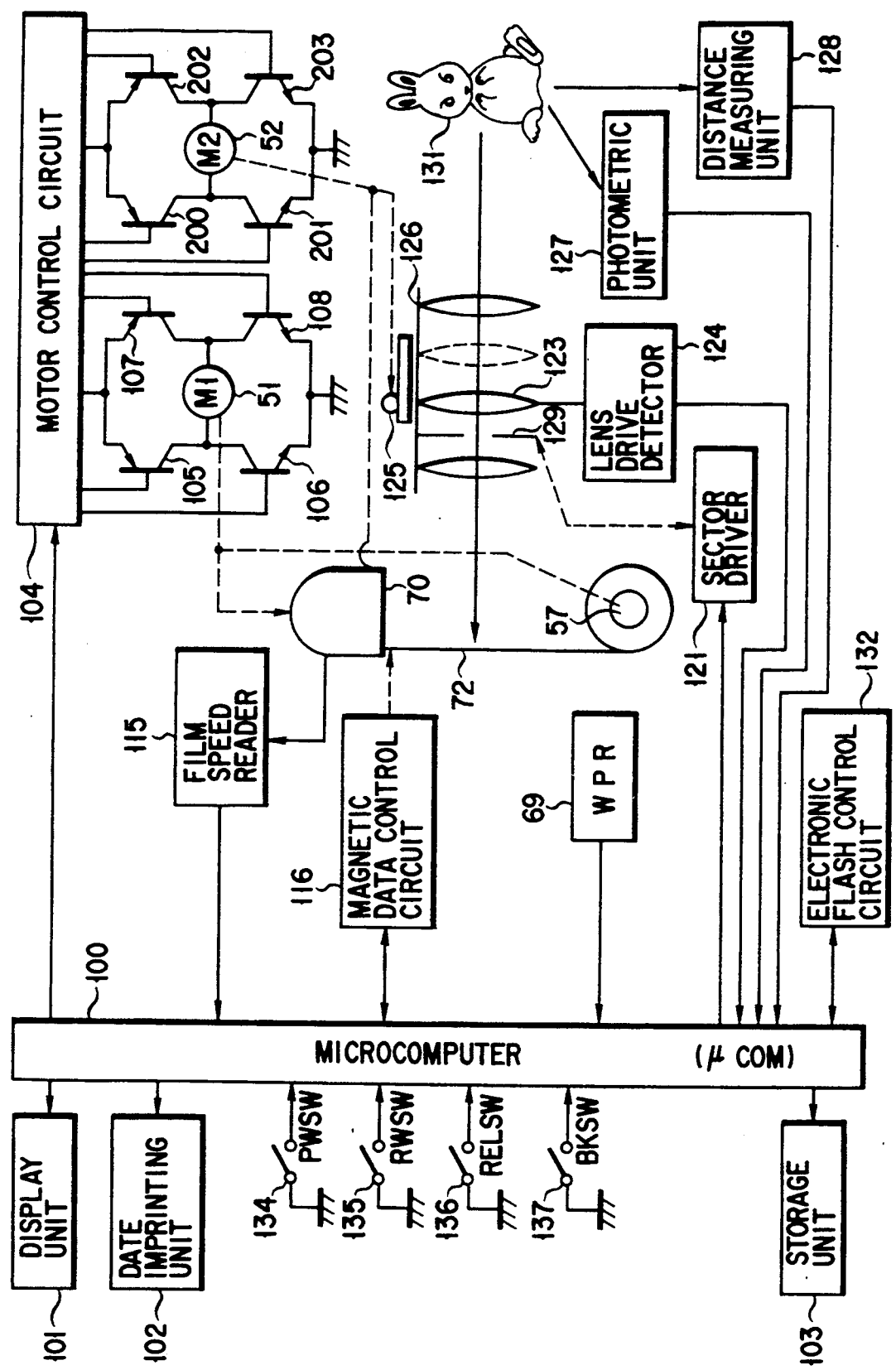
FIG. 1 is a block diagram showing the arrangement of the first embodiment of the present invention.

Reference will now be made in detail to the presently preferred embodiments of the invention as illustrated in the accompanying drawings, in which like reference characters designate like or corresponding parts throughout the several drawings.

FIG. 1 is a block diagram showing the arrangement of the first embodiment of the present invention. A display unit 101, a date imprinting unit 102, and a nonvolatile-type storage unit 103 such as an electrically erasable and programable read only memory (EEPROM) are connected to a microcomputer (to be referred to as a µcom hereinafter) 100 for performing overall control of a camera to which the embodiment is applied. The display unit 101 displays a frame count and the like by using a liquid crystal display (LCD). The date imprinting unit 102 serves to imprint a date on a film. The storage unit 103 (to be referred to as an EEPROM hereinafter) is constituted by an EEPROM or the like capable of electrically erasing data. The EEPROM 103 stores frame count data, various adjustment values, and the like. In addition, a motor control circuit 104 is connected to the µcom 100. The motor control circuit 104 decodes signals supplied from the µcom 100 to set motor voltages for driving motors M1 (51) and M2 (52) and select a motor and a motor operation (rotating, reversing, decelerating, or stopping). As will be described later, the motor M1 is used to perform wind and rewind operations of a film 72 with respect to a film cartridge 70 upon selectively interlocking with the film cartridge 70 and a wind-up spool 57, and the motor M2 is used to feed the film 72 from the film cartridge 70 upon interlocking therewith.

Transistors 105 to 108 and 200 to 203 are connected between the motor control circuit 104 and the motors M1 and M2. A motor bridge circuit is constituted by these transistors. The motor M1 is rotated clockwise when the transistors 105 and 108 are turned on; rotated counterclockwise when the transistors 106 and 107 are turned on; and decelerated when the transistors 106 and 108 are turned on. The motor M2 is rotated clockwise when the transistors 200 and 203 are turned on; rotated counterclockwise when the transistors 201 and 202 are turned on; and decelerated when the transistors 201 and 203 are turned on.

A film speed reader 115 and a sector driver 121 are also connected to the µcom 100. The film speed reader 115 reads film speed data and frame count data on the film cartridge 70 and transmits these data to the µcom 100. The sector driver 121 opens/closes a sector 129 upon reception of a signal from the µcom 100 and transmits data indicating the open/closed state of the sector 129 to the µcom 100.

Referring to FIG. 1, reference numeral 126 denotes a photographic lens group barrel, in which focusing lens 123, a lens drive detector 124, and a gear 125 are arranged. The lens drive detector 124 converts the movement of the focusing lens 123 into a pulse signal and transfers the signal to the µcom 100. The gear 125 serves to transmit a driving force from the motor M2 to the focusing lens 123. In addition, the barrel 126 houses the sector 129 driven by the sector driver 121.

A distance measuring unit 128 and a photometric unit 127 are connected to the µcom 100. The distance measuring unit 128 serves to measure the distance to an object 131 to be photographed. The photometric unit 127 serves to measure the brightness of the object 131. An electronic flash controller 132 is also connected to the µcom 100.

A power switch (PWSW) 134, a film halfway rewind switch (RWSW), a release switch (RELSW) 136, and a rear cover detection switch (BKSW) 138 are connected to the µcom 100. When the PWSW 134 is turned on, a photographic operation can be performed. The RELSW 136 is used to perform an exposure operation. The BKSW 138 is turned on when the rear cover of the camera main body (not shown) is open, thus detecting the open/closed state of the rear cover. A photoreflector (WPR) 69 is also connected to the µcom 100. The WPR 69 serves to detect perforations of the film 72. The WPR 69 generates two pulse signals for each perforation and outputs the signals to the µcom 100. The µcom 100 calculates the moving amount and speed of the film 72 on the basis of these pulse signals.

A magnetic data control circuit 116 is arranged to record and reproduce data on and from the magnetic track formed on the film 72, as will be described below.

Figure 2:
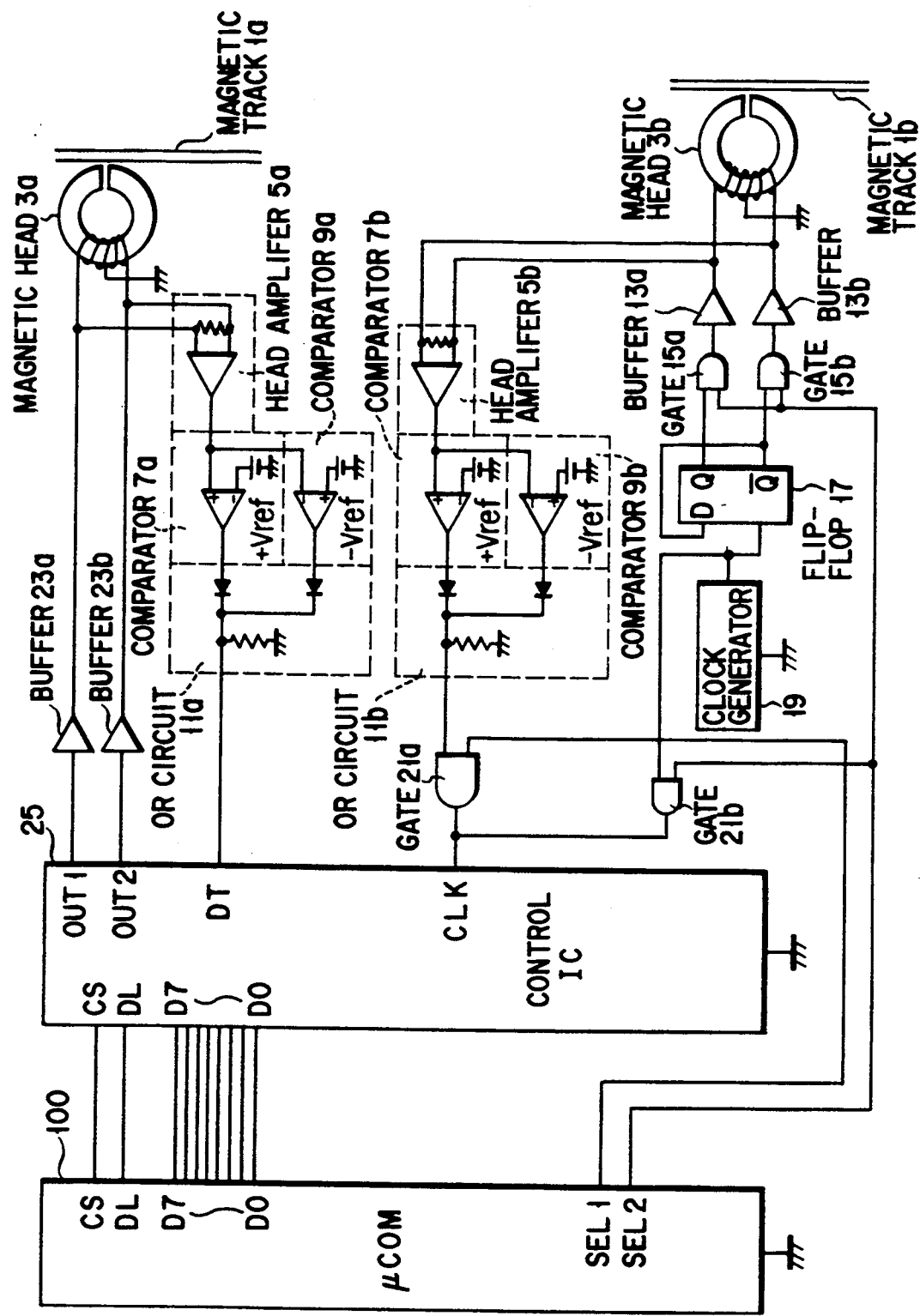
FIG. 2 is a block diagram showing the arrangement of a magnetic data control circuit in FIG. 1.

FIG. 2 is a block diagram showing the detailed arrangement of the magnetic data control circuit 116.

The µcom 100 controls a control integrated circuit (IC) 25 through control lines CS, DL, D7 to D0, SEL1, and SEL2. The control IC 25 executes recording and reproduction of data on and from a magnetic track 1a formed on part of the film 72 in accordance with instructions from the µcom 100. In this case, the above-mentioned magnetic track may be formed on the entire lower surface of the film 72.

A magnetic head 3a is used to record and reproduce data on and from the magnetic track 1a. In a data recording operation, buffers 23a and 23b supply currents to the magnetic head 3a in accordance with outputs OUT1 and OUT2 from the control IC 25. In a data reproducing operation, a head amplifier 5a amplifies a signal generated by the magnetic head 3a in accordance with a magnetic field on the magnetic track 1a. The waveform of this signal is then shaped by comparators 7a and 9a and an OR circuit 11a. The resultant signal is input to a terminal DT of the control IC 25. The control IC 25 reproduces the data on the magnetic track 1a from the signal input to the terminal DT and a sync signal (to be described later).

As a sync signal required for recording and reproduction of data, a clock signal input to a clock terminal CLK of the control IC 25 is used. As a clock signal for a data recording operation, a clock signal output from a clock generator 19 is used. This clock signal is recorded on a magnetic track 1b in parallel with a data recording operation. The recorded clock signal is used as a sync signal in a data reproducing operation. The output from the clock generator 19 is frequency-divided by a flip-flop 17. The resultant outputs are output to the buffers 13a and 13b through gates 15a and 15b, respectively. The buffers 13a and 13b supply currents to the magnetic head 3b in accordance with these outputs.

A signal generated by the magnetic head 3b in accordance with a magnetic field on the magnetic track 1b in a data reproducing operation is amplified by a head amplifier 5b. The waveform of the amplified signal is shaped by comparators 7b and 9b and an OR circuit 11b. A gate 21a is controlled by a signal from the μcom 100 through the control line SEL1. A clock signal output from the OR circuit 11b in a data reproducing operation is output to the clock terminal CLK of the control IC 25. The gates 15a and 15b and a gate 21b are controlled by a signal from the μcom 100 through the control line SEL2. In a data recording operation, the gate 21b outputs a clock signal from the clock generator 19 to the clock terminal CLK of the control IC 25. The gates 15a and 15b output signals from the flip-flop 17 to the buffers 13a and 13b.

Figure 3A:
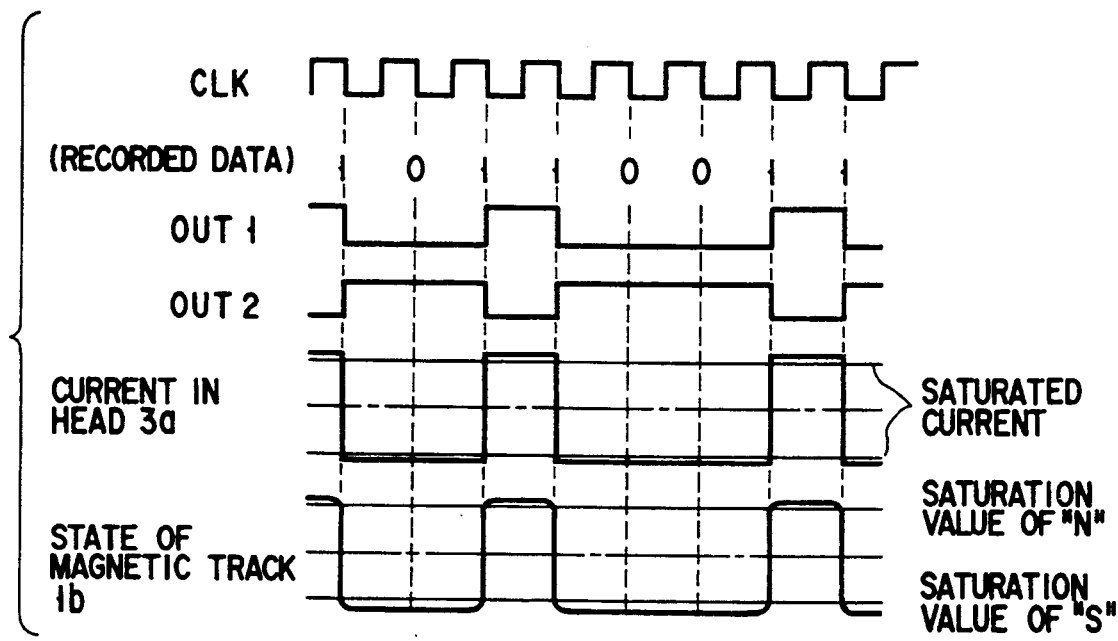
FIGS. 3A and 3B are timing charts showing a data recording operation.
Figure 3B:
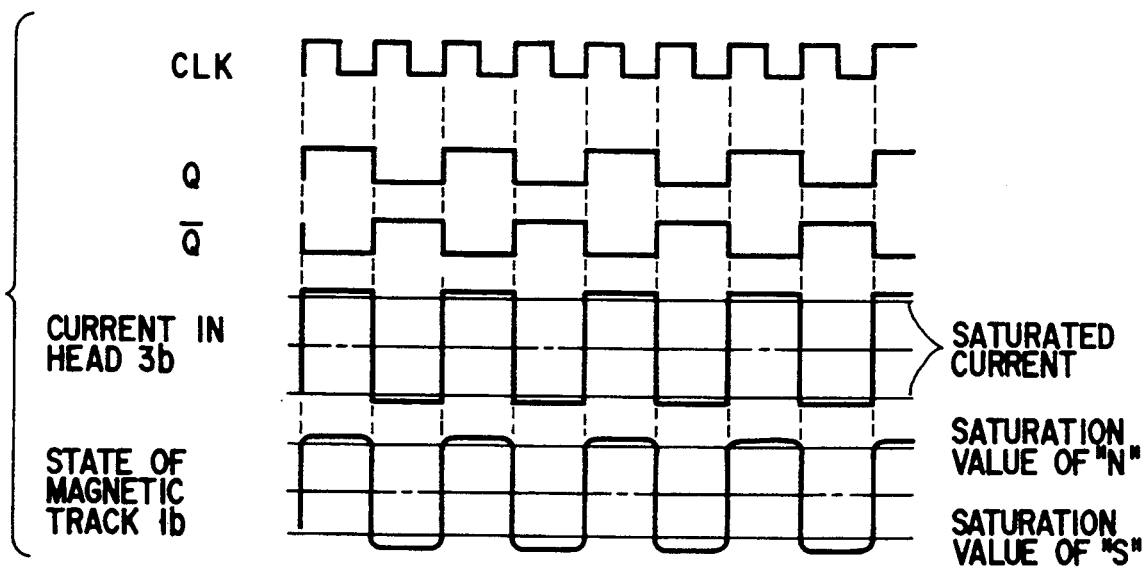

FIGS. 3A and 3B are timing charts showing a data recording operation.

Assume that data "10110011" is to be recorded. A data recording operation is performed by causing one of binary data ("1" in this embodiment) to correspond to magnetization inversion. More specifically, when data "1" is to be recorded, a state of magnetization is inverted to a saturation value of "N→S" (or a saturation value of "S→N"). When data "0" is to be recorded, a state of magnetization is kept unchanged. This recording scheme is NRZ1 (Non Return to Zero change to 1) recording. In order to perform this operation, when data "1" is to be recorded, the control IC 25 changes a high-level signal from the output terminal OUT1 to the output terminal OUT2 (or OUT2 to OUT1), thus inverting a head current. With this operation a current large enough to saturate a magnetic substance flows in the magnetic head 3a.

The time at which the control IC 25 outputs each data ("1" or "0") is determined by a clock signal from the clock generator 19. The control IC 25 changes the output states of the output terminals OUT1 and OUT2 thereof in synchronism with the trailing edge of this clock signal. The clock signal must be recorded on the magnetic track 1b. The clock signal is frequency-divided by the flip-flop 17. The resultant signals are output from terminals Q and $\overline{Q}$ of the flip-flop 17. The outputs from the output terminals Q and $\overline{Q}$ of the flip-flop 17 are inverted in synchronism with the leading edge of the clock signal. The buffers 13a and 13b supply currents to the magnetic head 3b in accordance with these outputs. Therefore, the state of magnetization of the magnetic substance is changed to the saturation value of "N→S" (or the saturation value of "S→N") in synchronism with the leading edge of the clock signal. In this case, synchronization is performed by using the leading edge of the clock signal unlike synchronization of data in consideration of a data reproduction operation. The reason why the clock signal is recorded on the magnetic track 1b simultaneously with the data recording operation is that it is difficult to record data at a constant moving speed of the film 72. In addition, there is no guarantee that the film moving speed is constant during a reproducing operation. For this reason, in the reproduction mode, signals are serially output at irregular intervals, and hence a constant clock signal cannot be used as a sync signal.

Figure 4:
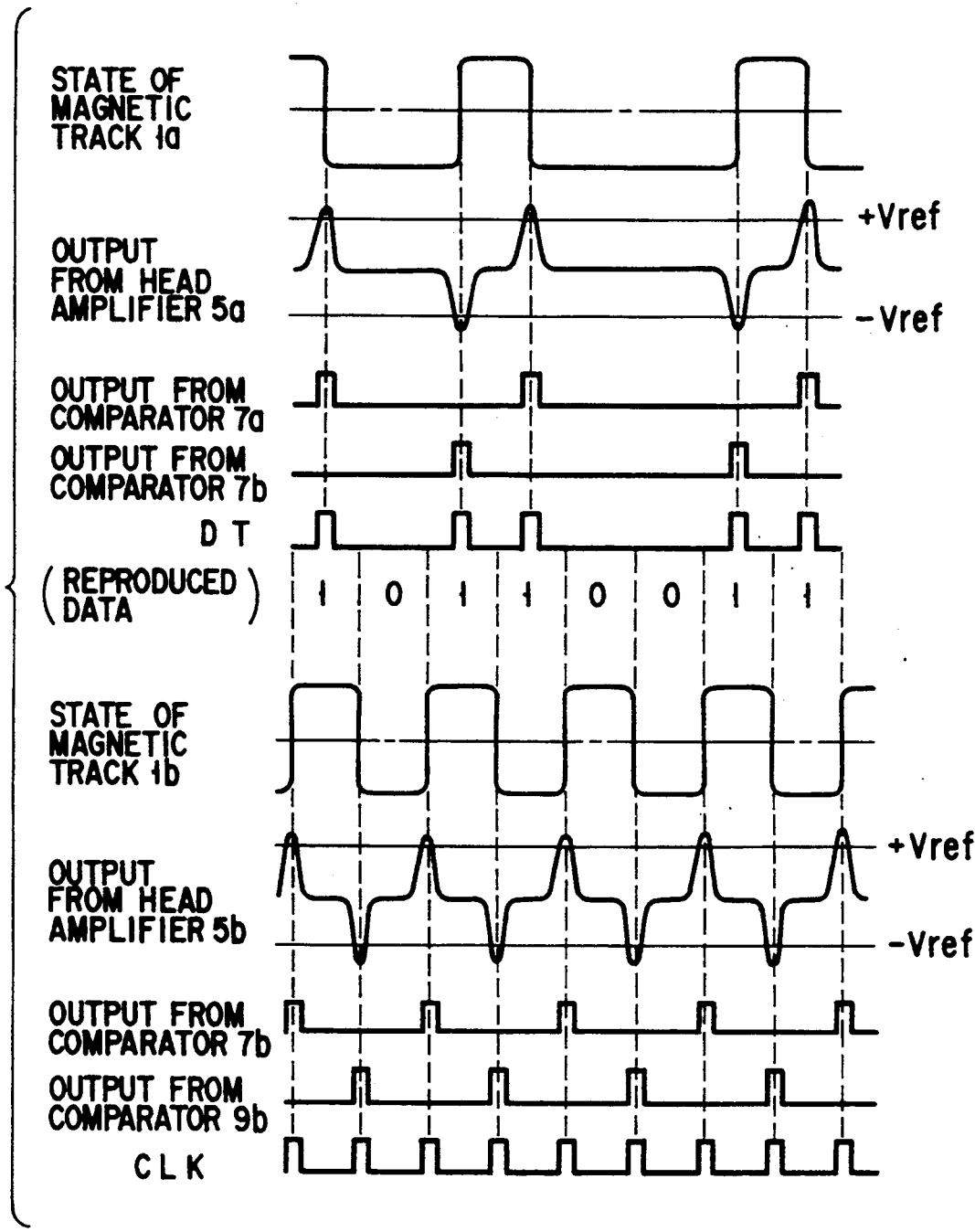
FIG. 4 is a timing chart for explaining a data reproducing operation.

FIG. 4 is a timing chart for explaining a data reproducing operation.

When a magnetized magnetic substance moves in front of a magnetic head, a magnetic flux passing the magnetic head changes, and the magnetic head generates a voltage in accordance with data recorded on the magnetic substance. If the magnetic track 1a is magnetized in the manner shown in FIG. 4, the magnetic head 3a generates a voltage at a position where the state of magnetization is inverted. This voltage is amplified by the head amplifier 5a and is output to the comparators 7a and 9a. The comparators 7a and 9a compare the output from the head amplifier 5a with a reference voltage +Vref and with a reference voltage −Vref, respectively. Both positive and negative signals output from the head amplifier 5a correspond to data "1".

The outputs from the two comparators 7a and 9a are synthesized with each other by the OR circuit 11a. The resultant value is output to the terminal DT of the control IC 25. The control IC 25 reproduces data recorded on the magnetic track 1a by using the input signal and a sync signal. As this sync signal, a clock signal recorded on the magnetic track 1b is used. This signal is detected by the magnetic head 3b. A voltage output from the magnetic head 3b is amplified by the head amplifier 5b. The voltage is then converted into a clock signal by the comparators 7b and 9b and the OR circuit 11b. The clock signal is output to the clock terminal CLK of the control IC 25. When a pulse signal is input to the terminal DT of the control IC 25 in the interval between two pulses of the clock signal, data "1" is reproduced. When no pulse signal is input to the terminal DT of the control IC 25 in this interval, data "0" is reproduced.

A method of communication between the control IC 25 and the μcom 100 will be described below with reference to the timing charts shown in FIGS. 5 to 7. This communication is started when the μcom 100 changes the level of the control line CS from high level to low level. Assume that a communication request is generated by only the μcom 100. Upon setting the control line CS at a low level, the μcom 100 outputs command data to the 8-bit data bus lines D7 to D0 in synchronism with a signal DL. The command data is used by the control IC 25 to identify a communication mode.

Therefore, in any communication mode, command data is set at the head of communication data.

Figure 5:
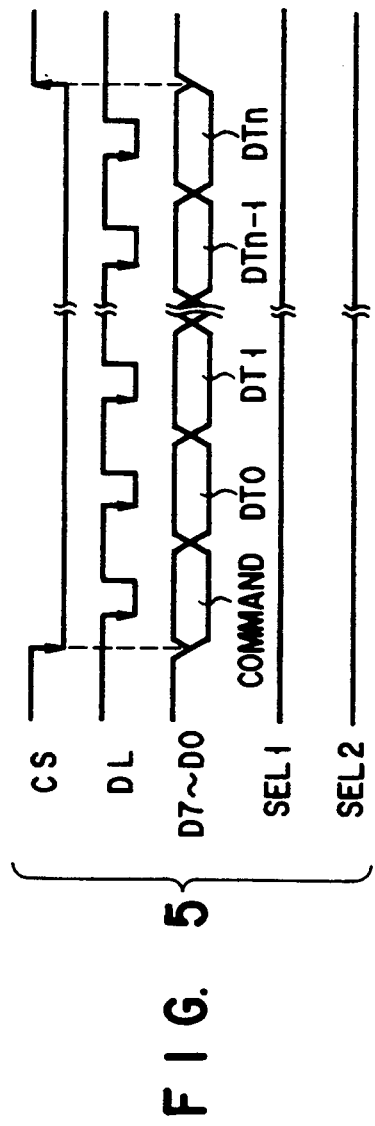
FIG. 5 is a timing chart for explaining a store mode.

FIG. 5 is a timing chart for explaining a store mode. In the store mode, data to be recorded is stored in the control IC 25 before it is recorded on the magnetic track 1a. Upon outputting command data, the μcom 100 sequentially outputs data to be recorded in the order in which the data are recorded on the magnetic track 1a. When transfer of all the data is completed, the μcom 100 changes the level of the control line CS from low level to high level, thus finishing communication.

Figure 6:
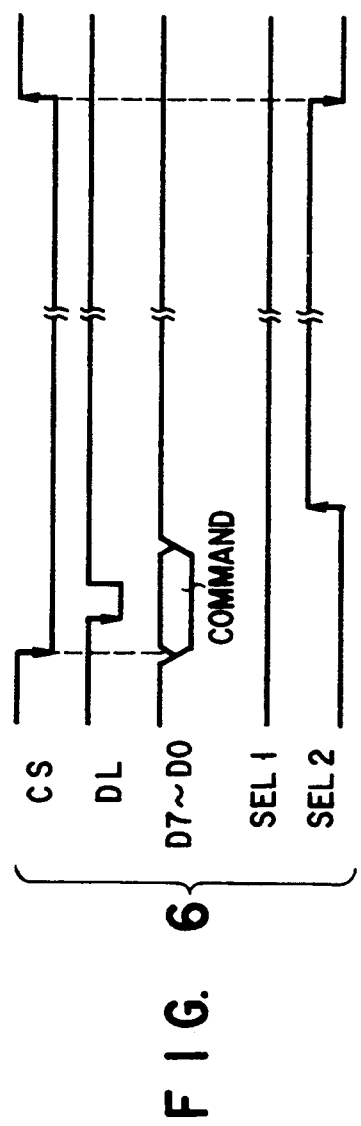
FIG. 6 is a timing chart for explaining a write mode.

FIG. 6 is a timing chart for explaining a write mode. The write mode is a mode for recording data on the magnetic track 1a. The control IC 25 supplies a current to the magnetic head 3a in response to command data from the μcom 100. Upon outputting the command, the μcom 100 changes the level of the control line SEL2 from low level to high level with this operation, a clock signal from the clock generator 19 is output to the clock terminal CLK of the control IC 25. The control IC 25 reads out data stored in the memory bit by bit in synchronism with the clock signal. When data "1" is to be recorded, the control IC 25 inverts a current supplied to the magnetic head 3a. Upon recording all the data in the memory, the control IC 25 finishes the operation. In order to stop the current supplied to the magnetic head 3a, the control IC 25 changes the level of the control line CS from low level to high level; and the level of the control line SEL2, from high level to low level.

Figure 7:
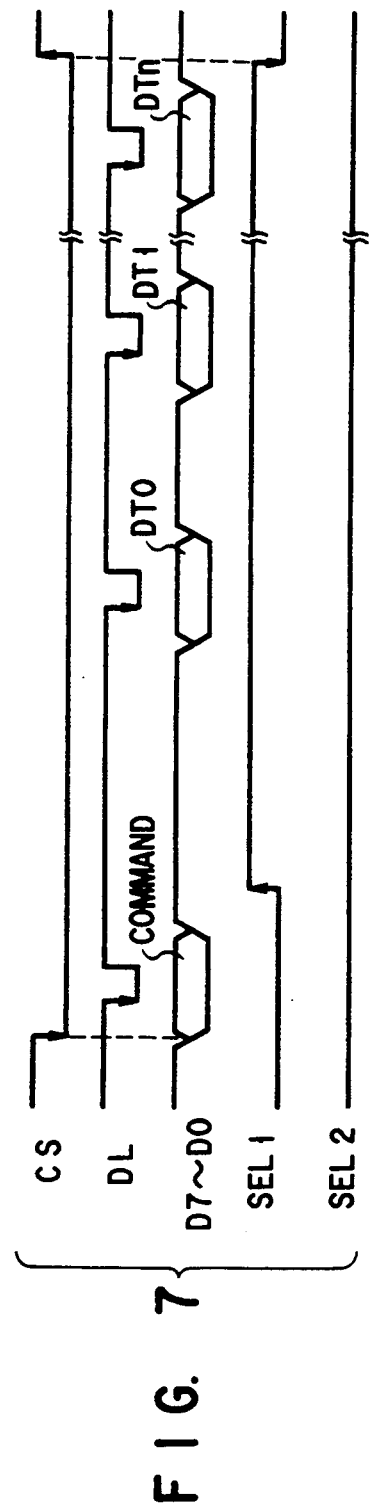
FIG. 7 is a timing chart for explaining a read mode.

FIG. 7 is a timing chart for explaining a read mode. The read mode is a mode for reproducing data recorded on the magnetic track 1a. Upon outputting command data, the μcom 100 changes the level of the control line SEL1 from low level to high level. As a result, a clock signal reproduced from the magnetic track 1b is output to the clock terminal CLK of the control IC 25. The μcom 100 reads data from the magnetic track 1a in synchronism with this clock signal. Upon reception of 8-bit data, the μcom 100 outputs the data to bus lines D7 to D0. Since the control IC 25 outputs a signal to the control line DL in order to latch the data, the μcom 100 loads the data in synchronism with the signal output to the control line DL. The data reproduction operation is continued until the μcom 100 changes the level of the control line CS from low level to high level.

Figure 8:
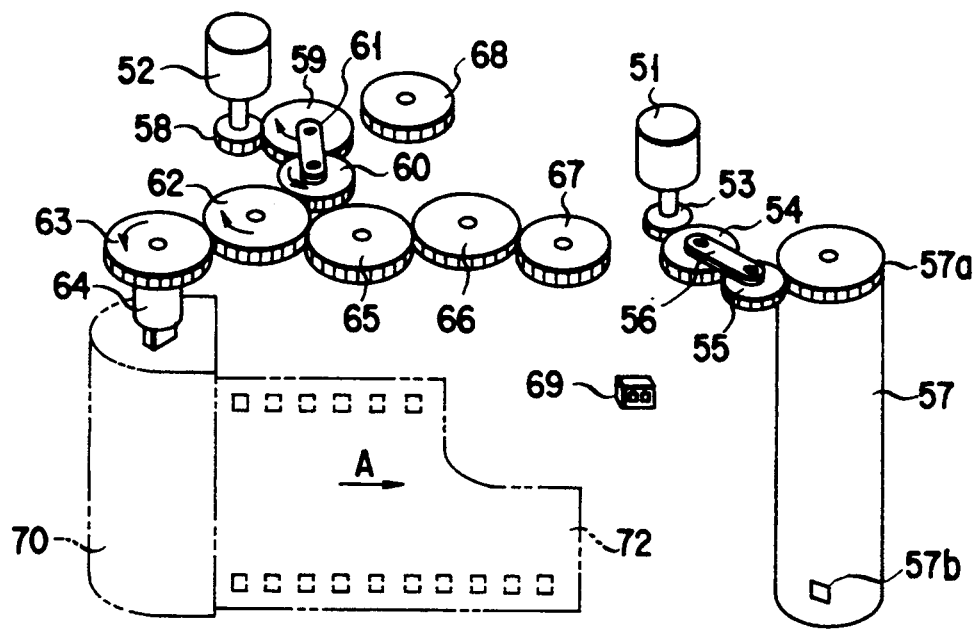
FIG. 8 is a perspective view showing a state immediately after a film cartridge is mounted in a camera main body.
Figure 9:
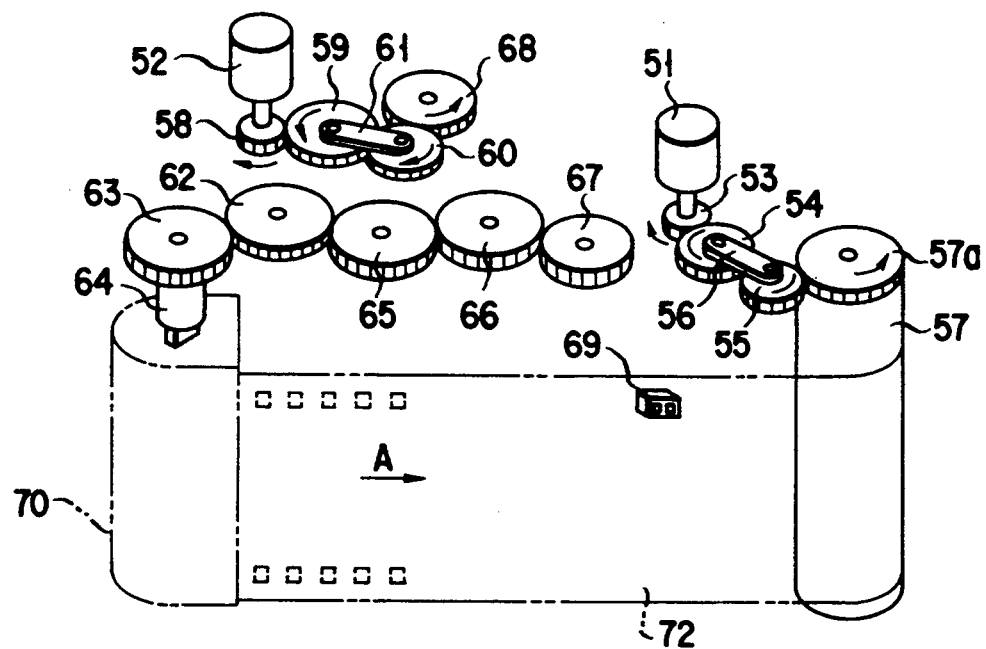
FIG. 9 is a perspective view showing a state wherein a film is wound around a wind-up spool.
Figure 10:
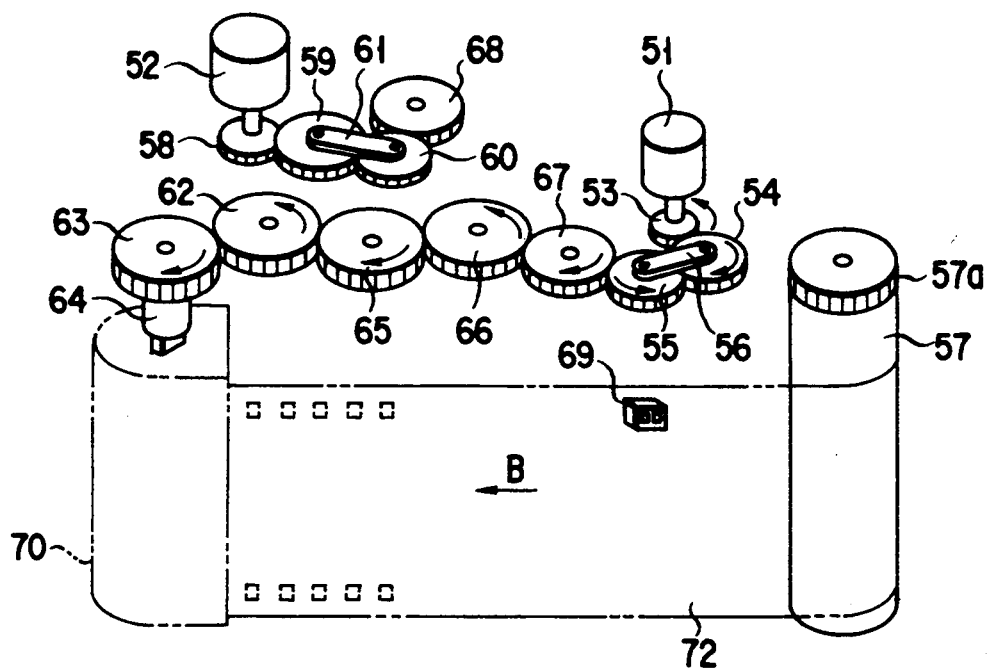
FIG. 10 is a perspective view showing a state wherein the film is rewound into the film cartridge.
Figure 11:
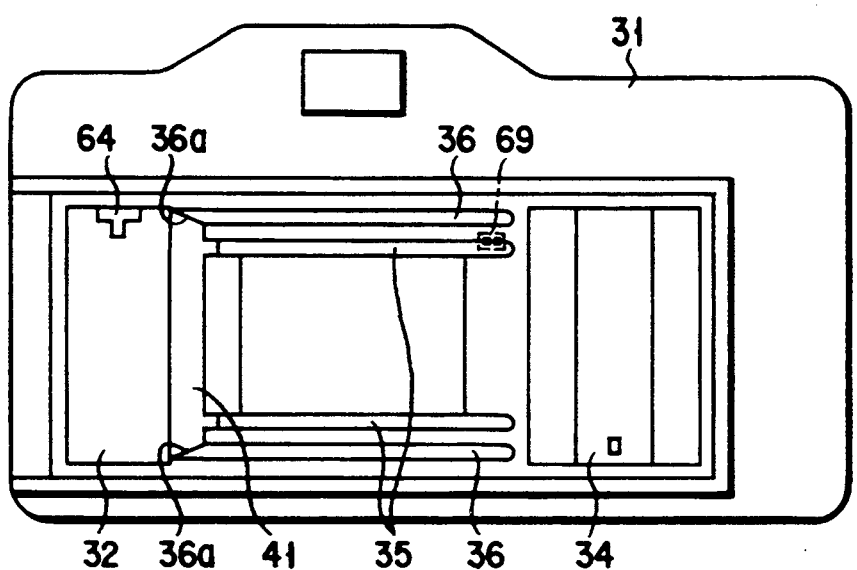
FIG. 11 is a rear view of a camera without a rear cover.

FIGS. 8 to 10 are perspective views, each showing a film feed unit of the camera according to the first embodiment of the present invention when viewed from the rear side of the unit. FIG. 8 shows the state of the film feed unit immediately after the film cartridge 70 is mounted in the camera main body. FIG. 9 shows a state wherein the film 72 is wound around the wind-up spool 57. FIG. 10 shows a state wherein the film 72 is rewound into the film cartridge 70. FIG. 11 is a rear view of the camera without the rear cover in the embodiment. FIG. 12 is a horizontal sectional view of the camera of the embodiment, FIG. 13 is a perspective view of the film cartridge 70 used in the camera of the embodiment.

Referring to FIGS. 8 to 10, a pinion gear 53 is mounted on the output shaft of the film wind/rewind motor 51 arranged in a camera main body 31 in FIG. 11. The pinion gear 53 is meshed with a sun gear 54. The sun gear 54 is meshed with a planetary gear 55. The planetary gear 55 is supported by a gear arm 56 to revolve around the rotational axis of the sun gear 54.

The wind-up spool 57 for rewinding the film 72 is rotatably arranged in a film wind-up chamber 34 arranged in the camera main body 31 on the right side when viewed from the rear, A spool gear 57a is integrally formed on the upper end face of the wind-up spool 57. The spool gear 57a is meshed with the planetary gear 55 when the planetary gear 55 revolves counterclockwise, A perforation lock pawl 57b engaged with each perforation of the film 72 (to be described later) protrudes from a lower portion on the outer surface of the wind-up spool 57.

An idle gear 67 is disposed at a position at which the idle gear 67 is meshed with the planetary gear 55 when the planetary gear 55 revolves clockwise. In this case, the planetary gear 55 is coupled to a coupler gear 63 (to be described later) through the idle gear 67 and idle gears 66, 65, and 62.

The film feed motor 52 (M2) is arranged in the camera main body 31. A pinion gear 58 is mounted on the output shaft of the film feed motor 52. The pinion gear 58 is meshed with a sun gear 59. The sun gear 59 is meshed with a planetary gear 60. The planetary gear 60 is supported by a gear arm 61 to revolve around the rotational axis of the sun gear 59.

A film cartridge housing chamber 32 in which the film cartridge 70 indicated by the alternate long and two short dashed lines in FIG. 8 is housed is arranged in the camera main body 31 on the left side when viewed from the rear. A coupler gear 63 having a coupler 64 having a distal end protruding in the form of a projection as shown in FIG. 11 is rotatably arranged above the film cartridge housing chamber 32. As indicated by the perspective view of FIG. 13, the coupler 64 is engaged with a groove formed in the upper end face of a feed spool 71, disposed in the film cartridge 70, so as to be rotated about the axis of the film cartridge 70 integrally with the feed spool 71. The coupler gear 63 is always meshed with the idle gear 62, as described above.

The photoreflector (to be referred to as the WPR) 69 fixed to the camera main body 31 is disposed at a position slightly closer to the center of the camera main body 31 than the wind-up spool 57 at the same level as that of the upper perforations of the film 72. The WPR 69 outputs a pulse signal every time an upper perforation of the film 72 passes the WPR 69.

As shown in FIG. 12, the film cartridge housing chamber 32 and the film wind-up chamber 34 are integrally formed of the same member and are housed in the camera main body 31. As shown in FIG. 12, a shutter mechanism 38 and a photographic lens 37 are disposed in front of the two chambers 32 and 34, and a battery 44 and an electronic flash capacitor 43 are housed on the right side of the film wind-up chamber 34.

A rear cover 42 is arranged behind the film cartridge housing chamber 32 to be freely opened/closed with respect to the camera main body 31. A pressure plate 40 for pressing the film 72 forward is disposed on the right side of the rear cover 42. A film rail surface 35 and a pressure plate rail surface 36 are arranged to oppose the pressure plate 40. The film 72 is pressed against these members to maintain its flatness.

The pressure plate 40, the film cartridge housing chamber 32, and the pressure plate rail surface 36 respectively have inclined guide surfaces 40a, 41, and 36a. These inclined guide surfaces 40a, 41, and 36a serve to guide the film 72 in the height direction when the film 72 is fed by the feed spool 71 disposed in the film cartridge 70.

An operation of the μcom 100 will be described below with reference to FIGS. 14 to 21.

A main routine will be described first with reference to FIG. 14.

When the battery 44 is mounted in the camera, the μcom 100 is reset upon power-on operation and starts the routine from step S100. In step S100, the μcom 100 performs initialization of the I/O port and the memory and the like. In step S102, the μcom 100 checks the state of the BKSW. If the rear cover is closed, a BKSW rise signal is generated. When the signal is detected, the flow advances to step S104. In step S104, a "blind exposure" operation of winding the mounted film 72 around the wind-up spool 57 is executed. If the BSKW rise signal is not detected, the flow advances to step S106 to check the state of the rewind switch RWSW. If the switch is ON, a subroutine "film rewind processing" is executed (step S108). This subroutine will be described later. When the switch is OFF, the flow advances to step S110 to check the state of the power switch PWSW. When this switch is OFF, the μcom 100 is set in the stop mode. In the stop mode, the operation of the μcom 100 is stopped.

The operation of the μcom 100 is resumed when an interruption signal is generated upon operations of the following switches. When the PWSW is ON, the flow advances to step S114. In step S114, the operation mode of the camera, a frame count, and the like are displayed. In step S116, the μcom 100 checks the state of the release switch RELSW. If the RELSW is ON, the flow advances to step S118 to execute a subroutine "release processing". This subroutine will be described later. When the RELSW is OFF, the flow advances to step S102 to check the state of these switches.

Figure 19:
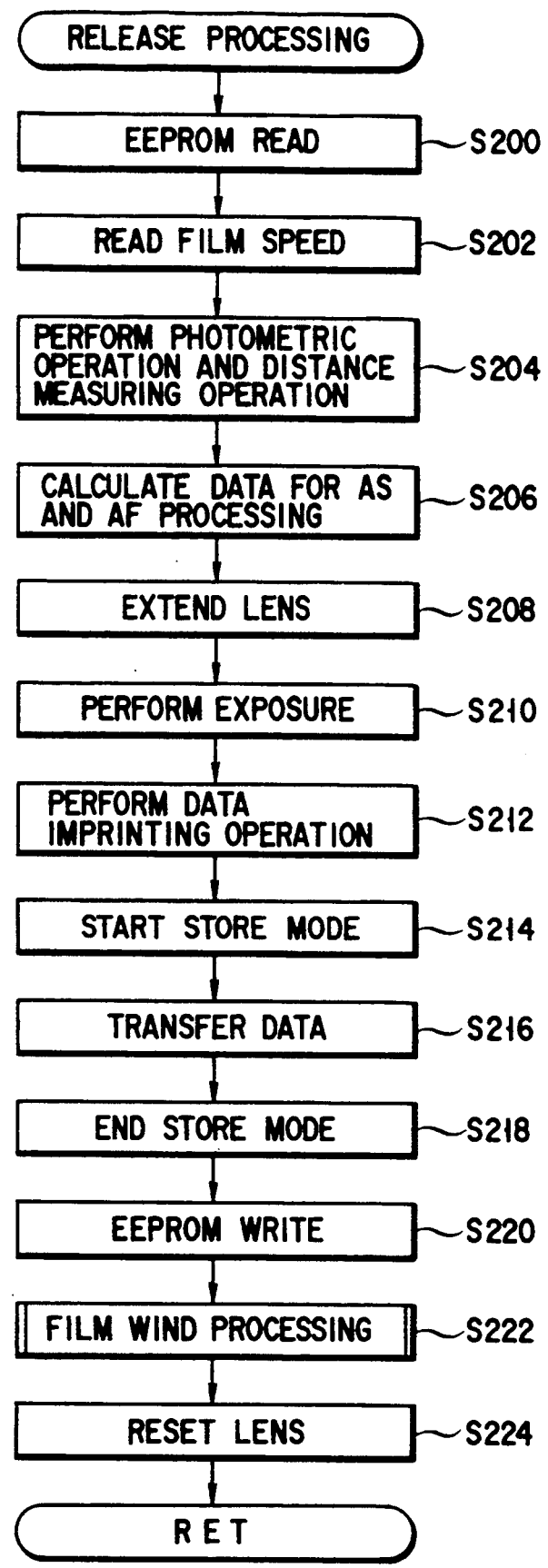
FIG. 19 is a flow chart for explaining a sequence of release processing.

The subroutine "release processing" will be described below with reference to FIG. 19. In step S200, data required for automatic exposure (AE) and automatic focusing (AF) processing is read from the storage unit 103 (to be referred to as the EEPROM hereinafter). In step S202, the μcom 100 reads a film speed from the film cartridge 70 through the film speed reader 115. In step S204, a distance measuring operation and a photometric operation are performed by using the distance measuring unit 128 and the photometric unit 127, thus obtaining a distance measurement value and a brightness value. In step S206, a lens extension amount is calculated on the basis of the distance measurement value, and an exposure time is calculated from the brightness value. In step S208, the motor M2 is rotated clockwise to extend the focusing lens. The lens extension amount is measured by counting pulse signals generated by the lens drive detector 124. When the count value coincides with the lens extension amount calculated in step S206, the motor M2 is stopped. Note that in a single-lens reflex camera, a mirror-up operation is performed in this case.

In step S210, a signal is supplied to the sector driver 121 to drive the sector 129, thus performing exposure. Note that a signal is supplied to the electronic flash controller 132 as needed to emit electronic flash light. Upon completion of exposure, a date imprinting operation is performed in step S212. In step S214, a store mode command is output to the control IC 25. In step S216, data to be recorded on the magnetic track 1a is transferred to the control IC 25. In step S218, the μcom 100 changes the level of the control line CS from low level to high level so as to terminate the store mode. In step S220, data identical to the data to be recorded on the magnetic track 1a is written in the EEPROM 103. The data stored in the EEPROM 103 is used as comparative data in the subroutine "film rewind processing" to be described later.

In step S222, a subroutine "film wind processing" is executed. In this subroutine, the film is wound by one frame and the data is recorded on the magnetic track 1a. The subroutine will be described later. In step S224, the focusing lens is restored to the initial position. Data to be transferred to the control IC 25 and data to be stored in the EEPROM 103 will be described below.

FIG. 15 shows data to be transferred to the control IC 25. Data are transferred in the order of numbers from 0 to $N_8$. The control IC 25 then records the data on the magnetic track 1a in the order of numbers from 0 to $N_8$. The transfer data at numbers 0 to $N_0$ are "00" so that there is no significant data in an area, of the magnetic track 1a, in which the data of numbers 0 to $N_0$ are recorded. The transfer data of numbers $N_7$ to $N_8$ are also "00". Therefore, there is no significant data in an area in which the data numbers $N_7$ to $N_8$ are recorded.

The reason why these two areas are arranged will be described below. If data is not correctly recorded on the magnetic track 1a the recording operation must be executed again. When the data recording operation is to be executed again by the magnetic data control circuit 116, the data on the magnetic track 1a need not be erased. This is because data is recorded by magnetizing a magnetic substance to the saturation value of the N or S. Therefore, it does not matter whether a magnetic substance is magnetized or not magnetized before data is recorded.

Consider a case wherein a recording operation is executed twice without the above-mentioned two areas. Assume that the film moving speed in the first recording operation is lower than that in the second recording operation.

FIG. 20 shows the magnetized states of the magnetic track 1a in the first and second recording operations. A hatched portion $B_1$ is an area magnetized in the first recording operation. Areas A and C are areas in which no data can be recorded because of a large change in the moving speed of the film.

A recording operation is executed while the film 72 is wound by one frame. Since the moving speed of the film 72 varies at the start and end of a film wind operation, a recording operation must not be executed during these periods. A hatched portion $B_2$ is an area magnetized in the second recording operation. If the recording speed remains the same, since the film moving speed in the second recording operation is lower than that in the first recording operation, the area $B_1$ is larger than the area $B_2$. As a result, part of the area magnetized in the first recording operation is left as an area $B_1'$. The data left in this area $B_1'$ is unnecessary data. If, therefore, a data reproducing operation is performed in this state, the data recorded on the area $B_2$ may not be correctly recognized. The area $B_1'$ can be reduced by changing the moving speed of the film 72 in accordance with the recording speed, or accurately controlling a recording start position on the magnetic track 1a. However, it is difficult to eliminate this area.

Consider a case wherein a recording operation is executed twice with the above-mentioned two areas arranged on the magnetic track 1a. Assume that the moving speed of the film 72 in the second recording operation is lower than that in the first recording operation. This case will be described with reference to FIG. 21. In this case, part of an area magnetized in the first recording operation is also left as an area $B_1'$. The portions indicated by the lateral hatching are areas in which insignificant data are recorded. Even if, therefore, the area $B_1'$ is read in a data reproducing operation, the data recorded in the area indicated by the oblique hatching can be recognized. The areas indicated by the lateral hatching can be increased by increasing the number of data "00" of numbers 0 to $N_0$ and numbers $N_7$ to $N_8$ in FIG. 15. As these areas are increased, the reliability of data to be recorded is improved. However, the number of data which can be recorded is decreased. Data "FF" of number $N_1$ and data "FF" of number $N_6$ are marks for separating an area for insignificant data from an area for significant data. The data "FF" is "11111111" in binary notation. When eight pulses are consecutively input to the terminal DT of the control IC 25 in FIG. 2 in a data reproducing operation, the control IC 25 determines that the above-mentioned mark is input.

Subsequently, the control IC 25 reproduces 8-bit serial data from the magnetic track 1a and converts the data into parallel data. The control IC 25 then transfers the data to the $\mu$com 100. Data "02" of number $N_2$ is a code indicating the start of data. Data "03" of number $N_5$ is a code indicating the end of the data.

Data of numbers $N_3$ to $N_3+13$ are date data. Data converted by the character code table shown in FIG. 16 is used. FIG. 16 shows the ASCII code defined by the ANSI. A character code table defined by the ISO may be used instead. By recording data by using such codes, the versatility of the data is improved, thus allowing easy use of the data. However, the amount of data to be recorded is increased. If characters are converted by using these code tables, the data length is 7 bits. Since data recording is performed in units of 8 bits, 1 bit is left unused. This 1 bit may be used as a redundant bit required for a parity check. A description of a parity check will be omitted in the embodiment. A parity check may be executed by the control IC 25 in FIG. 2. Character data is added to numeric data to identify its meaning.

Data "DATE" of numbers $N_3$ to $N_3+3$ are data for identifying numeric data of numbers $N_3+4$ to $N_3+13$ as date data. Similarly, data "TV", data "AV", and data "EXP" respectively indicate an F-number, a shutter speed, and a frame count. In some method, the meanings of numeric data are identified in accordance with the recording order of the data. If, however, the recording order is unknown, meanings cannot be identified. Therefore, adding character data for identification to numeric data is preferable, considering the use of the data, even though the amount of data is increased. The recording order must be determined such that data of greater importance is recorded earlier. This is because the probability that data having higher priorities are recorded when a film is stopped for some reason during a data recording operation is increased. Consider, for example, date data "minute", "hour", "day", and "month". The photographer does not remember the time at which photography is performed, but often remembers the month and day on which photography is performed. Therefore, it is convenient for the photographer to record data "minute" and "hour".

Figure 17:
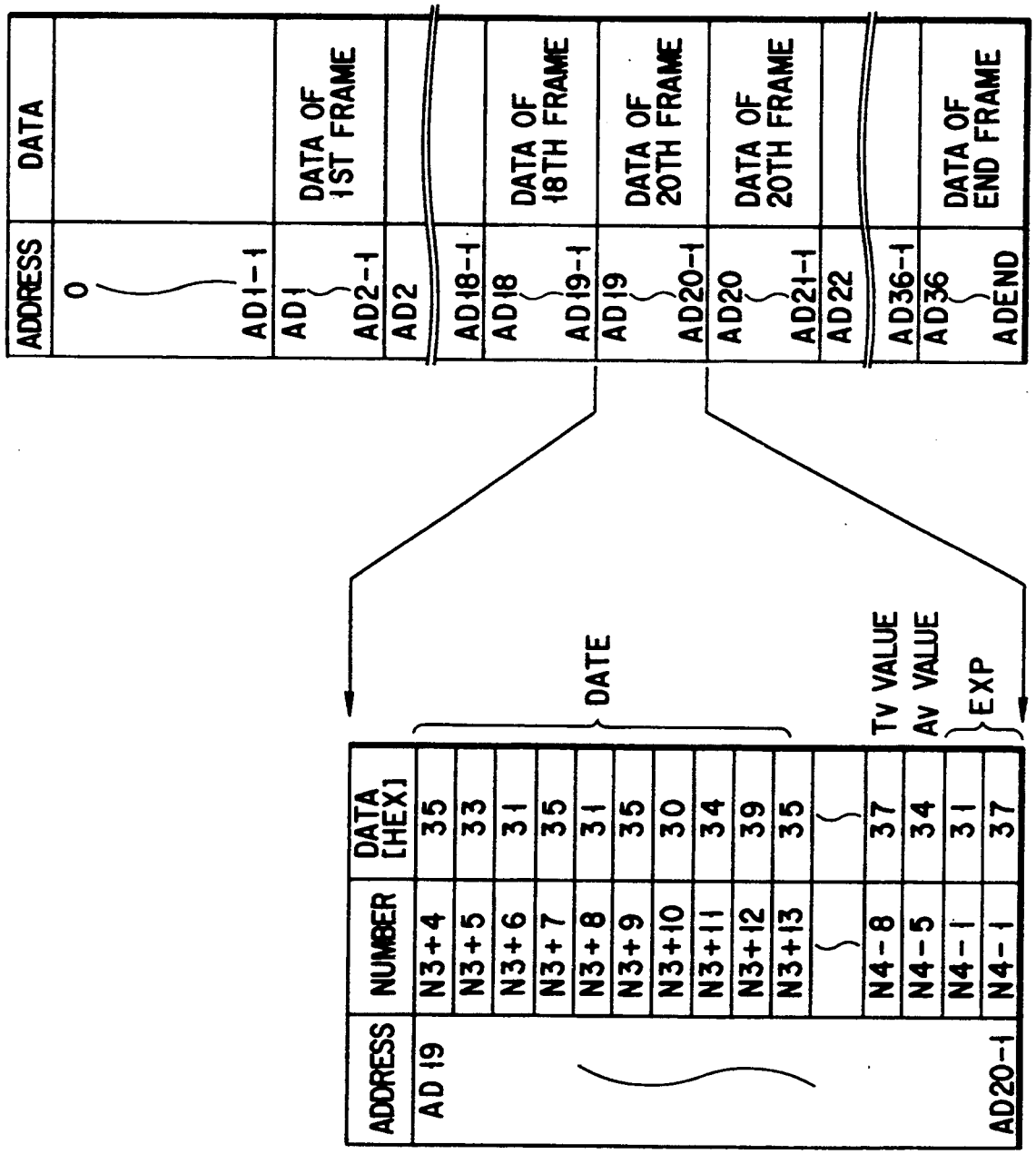
FIG. 17 is a view showing data to be stored in an EEPROM.

Data to be stored in the EEPROM 103 will be described with reference to FIG. 17. Frame count data of a film, adjustment data required for AE and AF processing, and the like are recorded at addresses 0 to AD1−1. Data recorded on the magnetic track 1a in a photographic operation for the first frame are stored at addresses AD1 to AD2−1. Similarly, data recorded on the magnetic track 1a in the respective photographic operations are stored in corresponding areas.

The data shown in FIG. 15 corresponds to the data of the 19th frame. Data stored at addresses AD19 to AD20−1 are shown on the left side in FIG. 17. The numbers on the left side in FIG. 17 are the same as those in FIG. 15.

Data to be stored in the EEPROM 103 are numeric data. Identification data (e.g., the data "DATE" of numbers $N_3$ to $N_3+3$) for numeric data are commonly used for any photographic data. If these data are stored in the EEPROM 103 every time photography is performed, a corresponding memory area is wasted. For this reason, there are no numbers corresponding to the identification data on the left side in FIG. 17. The capacity of an EEPROM used for a camera is generally small. Therefore, a means for efficiently using the memory must be provided. Numeric data may change for every photographic operation and hence needs to be stored in the EEPROM. If there is data other than numeric data which changes for every photographic operation, such data must also be stored in the EEPROM.

Identification data is stored in a program memory in the $\mu$com 100. A method of storing identification data will be described below with reference to FIG. 18. Data at addresses TAD0 to TADn correspond to the data of numbers $N_3$ to $N_4$ in FIG. 15. Note that "00" is set at an address corresponding to each numeric data. "00" is insignificant data according to the ASCII code. The data "00" is set in consideration of a case in which it is checked whether data is correctly recorded on the magnetic track 1a.

In the above-described embodiment, only numeric data is stored in the EEPROM to suppress an increase in the capacity of the EEPROM. However, the capacity of the EEPROM can be further reduced. In this case, numeric data is obtained by converting a number into a character code. For this reason, such numeric data requires a memory capacity twice that required to store the corresponding number. For example, numbers 0 to 9 can be expressed by 4 bits. If, however, such a number is expressed by using a code table, 7-bit data is obtained. 7-bit data is handled as 8-bit (1 byte) data. Therefore, the required memory capacity is doubled. Data stored in the EEPROM is used as comparative data for checking whether data is correctly recorded on the magnetic track 1a. Therefore, data can be stored in any form as long as it can be converted into data corresponding to the code table when comparison is performed. For example, if "5" and "3" of numbers $N_3+4$ and $N_3+5$ are stored according to the code table, they are stored as 2-byte data, i.e., "35" [HEX] "33" [HEX]. However, "5" and "3" can also be expressed as "53" [HEX]. Hence, a memory capacity of only 1 byte is required. If this data is converted into 2-byte data according to the code table when it is used as comparative data, no problem is posed. In the subroutine "comparison" shown in FIG. 24 which will be described later, the above-described storage scheme is not used. However, this scheme can be executed if the process of converting data stored in the EEPROM according to the code table is added to the processing in step S406. There is a method of reducing the amount of data to be stored in the EEPROM. All data need not be correctly recorded on the magnetic track 1a. Of the data shown in FIG. 15, the date data is important. In addition, if there is data required for printing, it is also important. That is, no omission of such data is allowed. However, errors in a TV value, an AV value, and the like do not pose any serious problems. Therefore, of the data recorded on the magnetic track 1a, only important data may be checked. This allows a further reduction in the number of comparative data to be stored in the EEPROM.

Figure 22:
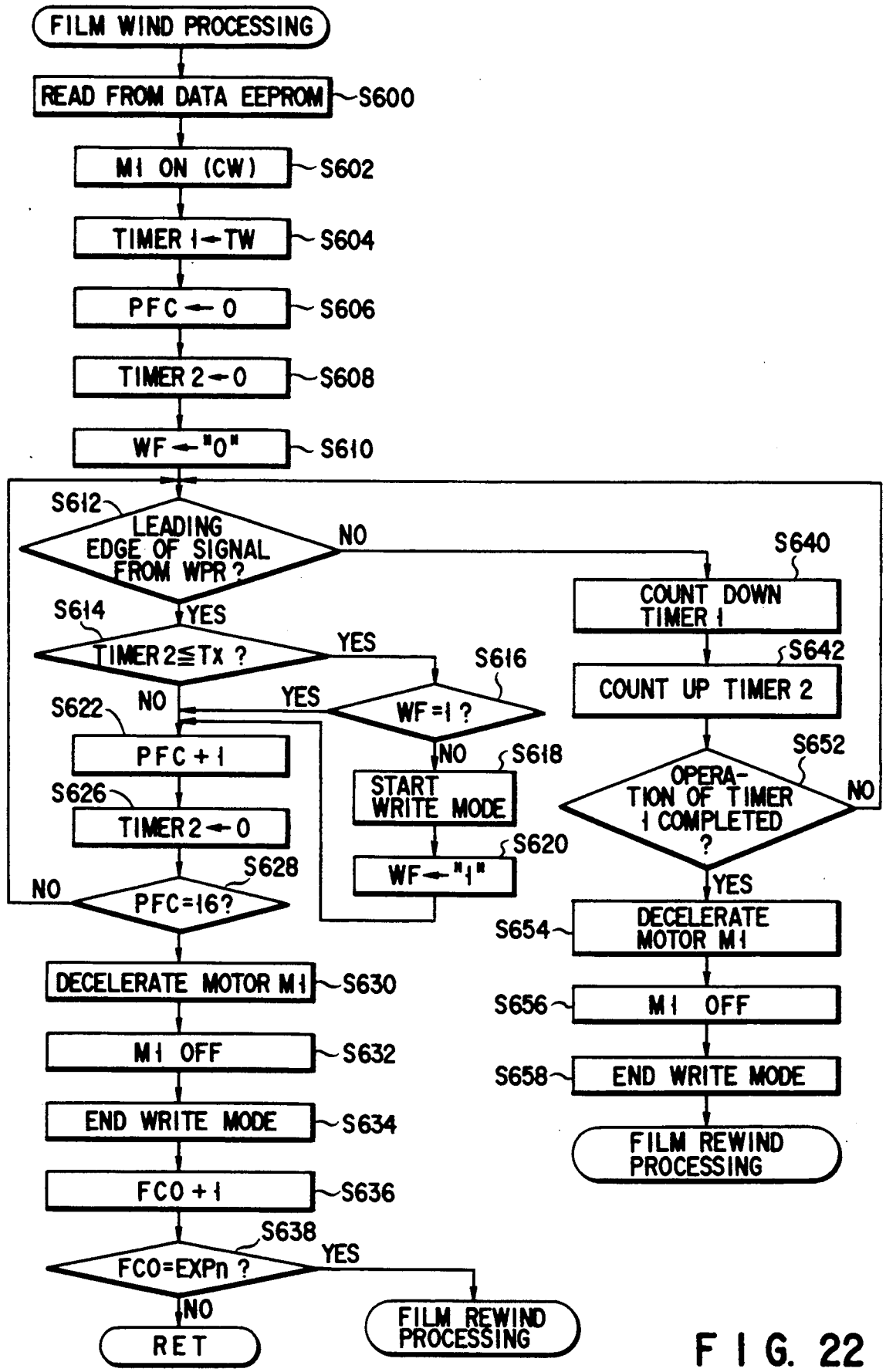
FIG. 22 is a flow chart for explaining a sequence of film wind processing.

The subroutine "film wind processing" will be described below with reference to FIG. 22.

In step S600, comparative data TX for a timer 2 (to be described later) is read out from the EEPROM. In step S602, the motor M1 is rotated clockwise, and the wind-up spool 57 starts to wind the film 72. In step S604, a time TW required to wind the film 72 by one frame is set in a timer 1. In step S606, a perforation counter PFC is cleared. In step S608, the timer 2 is cleared. The timer 2 is used to detect the moving speed of the film 72. In step S610, a write flag WF is cleared. This flag is set when a write command (FIG. 6) is output to the control IC 25. In step S612, a pulse signal from the photoreflector (WPR) 69 is checked. If the leading edge of the pulse signal is detected, the flow advances to step S614. Otherwise, the flow advances to step S640. In step S640, the timer 1 is counted down. In step S642, the timer 2 is counted up to measure the interval of pulses. In step S652, it is checked whether the counting operation of the timer 1 is completed. If YES in step S652, the flow advances to step S654. Otherwise, the flow advances to step S612. In steps S654 and S656, the motor M1 is stopped. In step S658, the level of the terminal CS is changed from low level to high level to stop the recording operation of the control IC 25. The flow then advances to the subroutine "film rewind processing". The termination of the counting operation of the timer 1 indicates that the film wind operation is not completed even after the time TW required to wind the film by one frame elapses. That is, it indicates the terminal end of the film. If the camera is properly operated, there is no possibility that the flow shifts from step S652 to the subroutine "film rewind processing". Normally, the flow shifts from step S638.

If the flow shifts from step S612 to step S614, it is checked whether the value of the timer 2 is smaller than the data TX. The TX is data which has already been read out from the EEPROM. The value of the timer 2 indicates the interval of pulses output from the photoreflector (WPR) 69. Therefore, the comparison result in step S614 indicates whether the moving speed of the film 72 becomes higher than a predetermined value. If the moving speed is higher than the predetermined value, the flow advances to step S616. Otherwise, the flow advances to step S622.

In step S616, the state of the write flag WF is checked. If the flag is set, the flow advances to step S622. If it is cleared, the flow advances to step S618. In step S618, a write command (described with reference to FIG. 6) is output to the control IC 25.

In step S620, the write flag is set. Subsequently, the processing in step S618 is not executed because the flag is set. The above-described processing in steps S614 to S620 is performed to inhibit a data recording operation in a region in which the moving speed of the film 72 is unstable during an initial period of a film wind operation. The region in which the moving speed of the film 72 is unstable varies depending on the type of the film 72 and a supply voltage. Therefore, the data TX is set with a margin in consideration of such variations.

In step S622, the perforation counter PFC is incremented. In step S626, the timer 2 is cleared to detect the moving speed of the film 72.

In step S628, it is checked whether the count value of the perforation counter PFC is "16". If NO in step S628, it means that winding of the film 72 by one frame is not completed, and the flow advances to step S612. If YES in step S628, the motor M1 is stopped by the processing in steps S630 and S632.

In step S634, the level of the terminal CS is changed from low level to high level to stop the recording operation of the control IC 25. In step S636, a film counter FCO is incremented. In step S638, it is checked whether the count value of the film counter FCO is "EXPn". "EXPn" is the specified frame count of the film 72 currently mounted in the camera. Since the specified frame count has a margin, photography can be performed a number of times larger than the specified frame count. Therefore, photography is normally performed until a film wind operation cannot be performed. A problem in such an operation is that the data of the end frame cannot be recorded on the magnetic track 1a because data is recorded while the film is moved.

For the above reason, the processing in step S638 is performed. If the value of the film counter FCO coincides with the value EXPn, the flow shifts to the subroutine "film rewind processing". Otherwise, the flow returns to the main routine.

Figure 23:
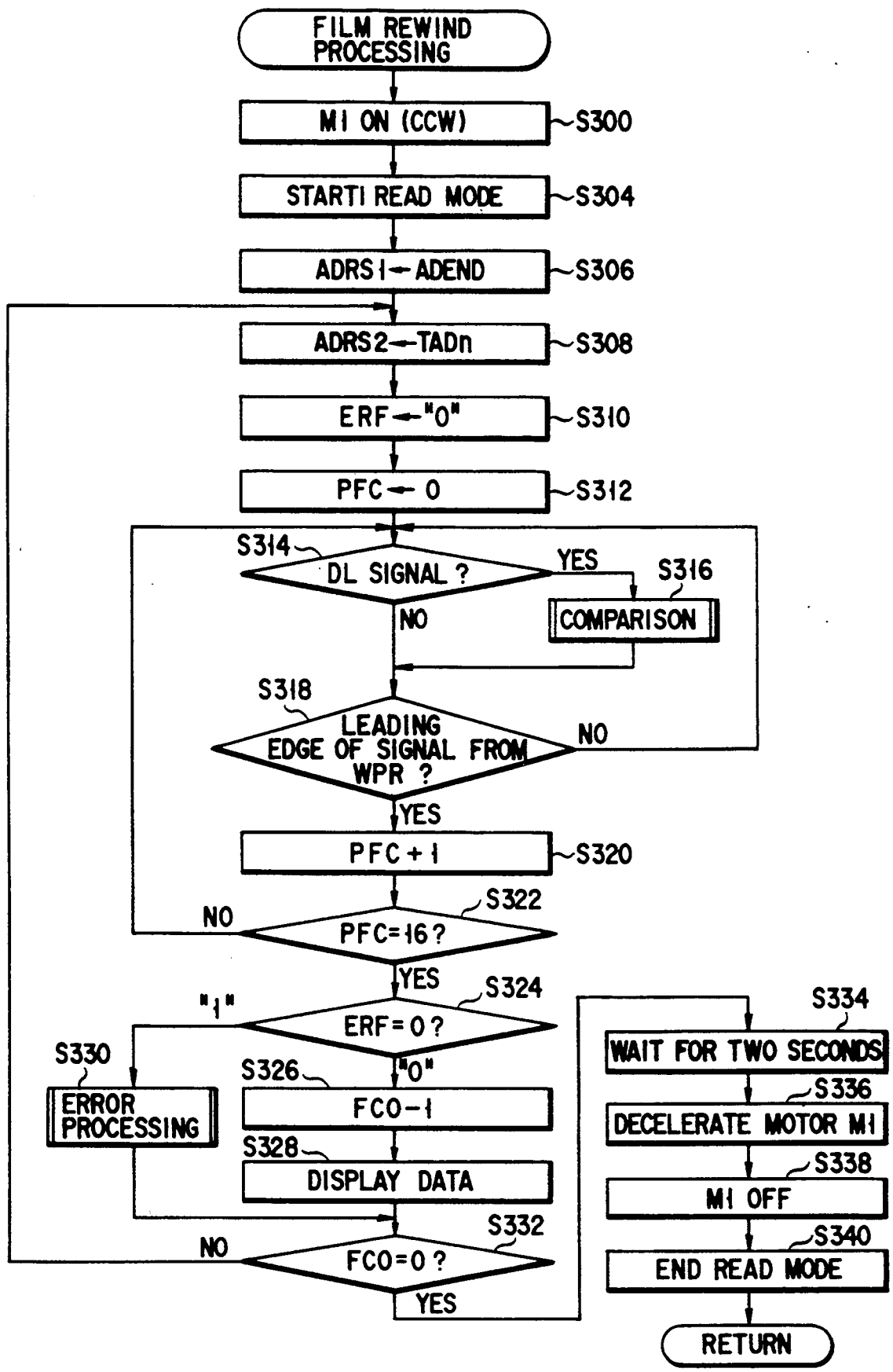
FIG. 23 is a flow chart for explaining a sequence of film rewind processing.

The subroutine "film rewind processing" will be described below with reference to FIG. 23.

In step S300, the motor M1 is rotated counterclockwise to start a film rewind operation. In step S304, a read command is output to the control IC 25. Subsequently, the control IC 25 reproduces data from the magnetic track 1a and outputs the data to the bus lines D7 to D0. In step S306, address data ADEND of the EEPROM is set in a register ADRS1. As has been described above, numeric data as part of the data recorded on the magnetic track 1a is stored in the EEPROM. The data ADEND indicates the bottom address of an area in which the numeric data is stored. In step S308, an address TADn of the program memory is set in a register ADRS2.

As has been described above, identification data as part of the data recorded on the magnetic track 1a is stored in the program memory. The data TADn indicates the bottom address of an area in which the identification data is stored. In step S310, an error flag ERF is cleared. The error flag ERF is set when there is an error in data reproduced from the magnetic track 1a. The error flag ERF is set in step S316. In step S312, the perforation counter PFC is cleared. The perforation counter PFC serves to count pulses output from the photoreflector (WPR) 69. When the count value of the perforation counter PFC reaches "16", rewinding of the film by one frame is completed. In step S314, the control IC 25 checks whether a latch signal is output to the line DL. The control IC 25 outputs reproduced data to the bus lines D7 to D0 in synchronism with this latch signal. If the latch signal is output, the flow advances to step S316. In step S316, the subroutine "comparison" is executed. In this subroutine, it is checked whether there is an error in the data reproduced from the magnetic track 1a. The subroutine will be described in detail later.

In step S318, it is checked whether a pulse signal is output from the WPR 69. If a pulse signal is detected, the flow advances to step S320. Otherwise, the flow advances to step S314. In step S320, the perforation counter PFC is incremented. In step S322, it is checked whether the count value of the perforation counter PFC becomes "16". If YES in step S322, it means that rewinding of the film by one frame is completed. If NO in step S322, the flow advances to step S314. Otherwise, the flow advances to step S324.

In step S324, the state of the error flag ERF is checked. If there is an error in one-frame reproduced data, the error flag ERF is set. If the error flag is at "1", the flow advances to step S330. In step S330, a subroutine "error processing" is executed. This subroutine will be described in detail later.

If the error flag is at "0", the flow advances to step S326. In step S326, the film counter FCO is decremented. In step S328, a frame count is displayed on the display unit 101. In step S332, it is checked whether the count value of the film counter FCO is "0". If NO in step S332, the flow advances to step S308. In order to check the reproduced data of the next frame, the register ADRS2, the flag ERF, and the perforation counter PFC are initialized. If the count value of the film counter FCO is "0", the film rewind operation is completed. In step S334, the flow waits for two seconds to allow the film 72 to be completely housed in the film cartridge 70. After the motor M1 is decelerated in step S336, the motor M1 is stopped in step S338. In step S340, the level of the line CS is changed from low level to high level to stop the reproducing operation of the control IC 25.

Figure 24:
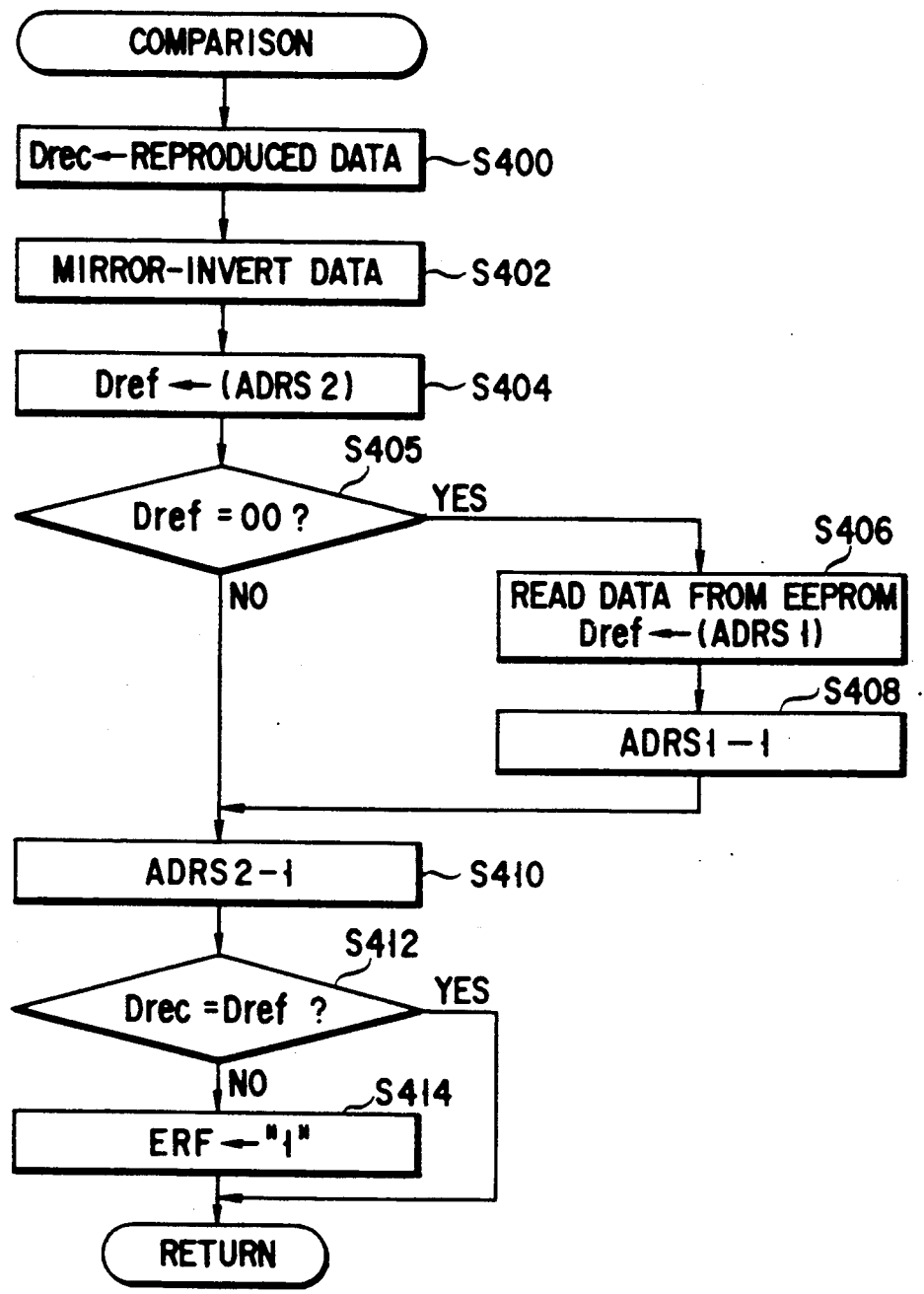
FIG. 24 is a flow chart for explaining a sequence of comparison.

The subroutine "comparison" will be described below with reference to FIG. 24.

In step S400, reproduced data is input through the lines D7 to D0 of the control IC 25 and is set in a register $D_{rec}$. In step S402, the data in the register $D_{rec}$ is mirror-inverted. The moving direction of the film 72 in the record mode is opposite to that in the reproduction mode. For this reason, the order of data must be reversed. If, for example, "10100001" is reproduced, "10000101" is obtained. Therefore, the data needs to be mirror-inverted. If, however, data stored in the program memory and the EEPROM are mirror-inverted relative to each other, the processing in step 402 is not required. In step S404, data in the program memory which corresponds to the address set in the register ADRS2 is set in a register $D_{ref}$.

In step S405, it is checked whether the data in the register $D_{ref}$ is "00". As has been described above, "00" is set at an address corresponding to numeric data. If YES in step S405, the flow advances to step S406 to read out numeric data from the EEPROM. The read data is then set in the register $D_{ref}$. An address of the EEPROM is set in the register ADRS1. In step S408, the address data in the register ADRS1 is decremented for the next operation.

If the data in the register $D_{ref}$ is not "00" in step S405, the data can be used as comparative data. In step S410, the address data in the register ADRS2 is decremented for the next operation. In step S412, it is checked whether the reproduced data in the register $D_{rec}$ coincides with the comparative data in the register $D_{ref}$. If YES in step S412, the flow returns to the main routine. If NO in step S412, the error flag ERF is set in step S414, and the flow returns to the main routine.

Figure 25:
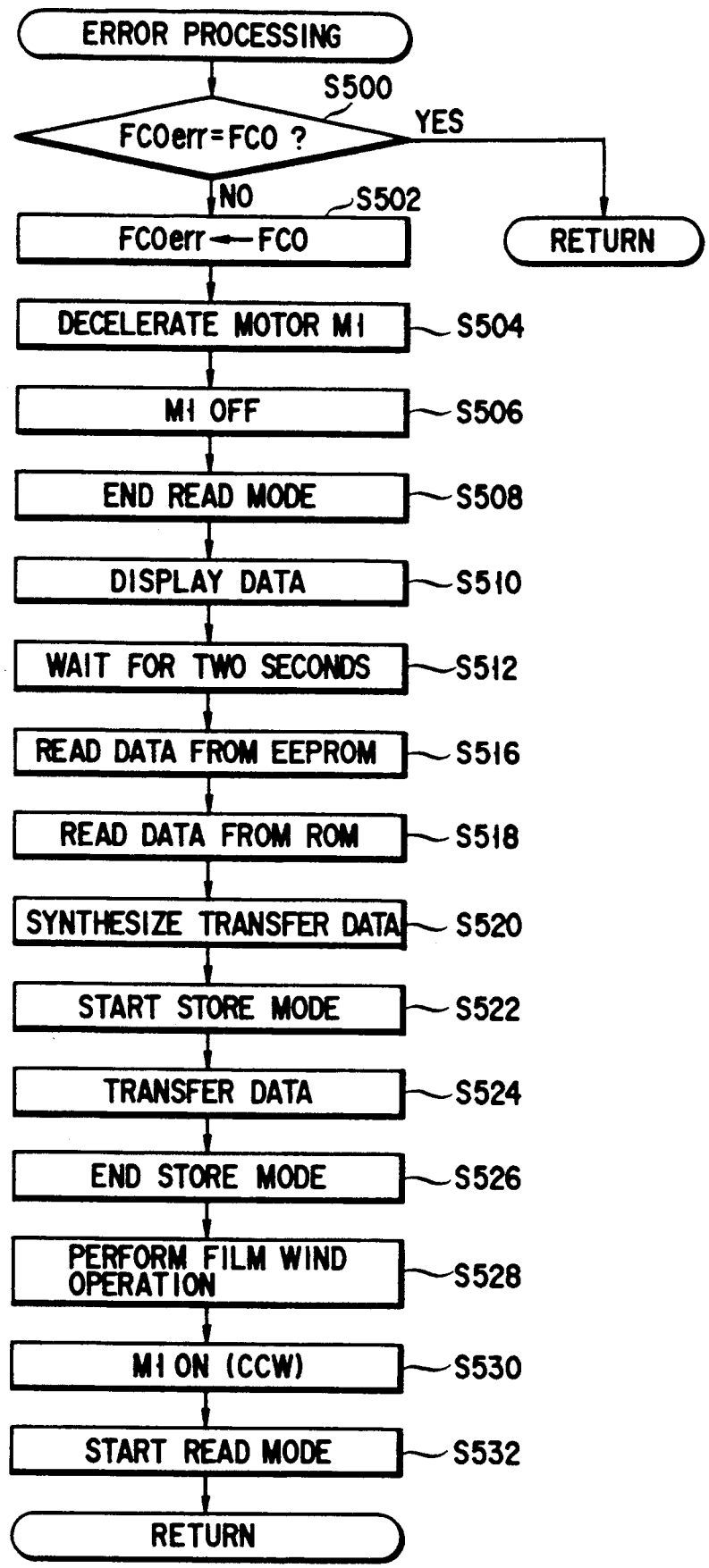
FIG. 25 is a flow chart for explaining a sequence of error processing.

The subroutine "error processing" will be described below with reference to FIG. 25.

In step S500, it is checked whether the value of a register $FCO_{err}$ coincides with the count value of the film counter FCO. If YES in step S500, the flow returns to the main routine. If NO in step S500, the flow advances to step S502 to set the frame count, obtained by the film counter FCO, in the register $FCO_{err}$. The decision in step S500 is required to prevent the μcom 100 from being trapped in an endless loop. The previous error frame count is stored in the register $FCO_{err}$. Coincidence between the previous error frame count and the count value of the film counter FCO indicates that a recording operation was performed twice with respect to the same location on the magnetic track 1a, and that data was not correctly recorded in the two recording operations. Such a situation is caused by flaws and the like on the magnetic track 1a. In this situation, it is impossible to correctly record data despite whether a recording operation is repeated many times. Therefore, recording and reproducing operations will be repeated endlessly without the processing in steps S500 and S502. In step S504, the motor M1 is decelerated, and is turned off in step S506. With this operation, the film rewind operation is temporarily stopped. In step S508, the level of the line CS of the control IC 25 is changed from low level to high level to stop the data reproducing operation. In steps S510 and S512, the presence of an error in the recorded data is displayed on the display unit 101 for a predetermined period of time. For example, an error is displayed in the manner shown in FIGS. 26A and 26B. In this case, "13" (FIG. 26A) and "Er" (FIG. 26B) are alternately displayed on segments for displaying a frame count for two seconds. This indicates that an error is caused in the 13th frame. An alarm may be generated if the camera has a sound generating element. In step S516, numeric data in the EEPROM which corresponds to the frame in which the error is caused is read out. In step S518, identification data is read out from the program memory. In step S520, transfer data such as the one shown in FIG. 15 is formed by synthesizing the two data. In step S522, a store command is output to the control IC 25. In step S524, the synthesized transfer data is output to the control IC 25. In step S526, the level of the line CS is changed from low level to high level to stop the execution of the store mode. In step S528, the subroutine "film wind processing" is executed again. As has been described above, a data recording operation is included in the subroutine "film wind processing". When the second recording operation is completed, the motor M1 is rotated counterclockwise in step S530. As a result, the film rewind operation is resumed. In step S532, a read command is output to the control IC 25 to start a data reproducing operation, and the flow returns to the main routine.

As has been described in detail above, according to the magnetic recording system for the camera according to the first embodiment, whether data is correctly recorded on a magnetic track can be determined for every photographic operation.

According to the first embodiment described above, there is proposed a magnetic recording system for a camera, which compares magnetic data recorded on a film with a corresponding value in an EEPROM to generate an alarm, display an error in data, and rewrite the data if they do not coincide with each other.

As described above, in the first embodiment, if data incoincidence is determined, a data rewrite operation is performed. However, there is no guarantee that data can be correctly rewritten, if there are flaws and the like on a magnetic recording portion. In addition, if data is not correctly written, the data may be erroneously recognized in a developing or printing operation. As a result, processing may be performed by using false data.

In the second embodiment proposed next, if data incoincidence occurs, part of the magnetic data on the film is erased to prevent false data processing in the subsequent steps.

The second embodiment of the present invention will be described below with reference to the accompanying drawings.

Figure 27:
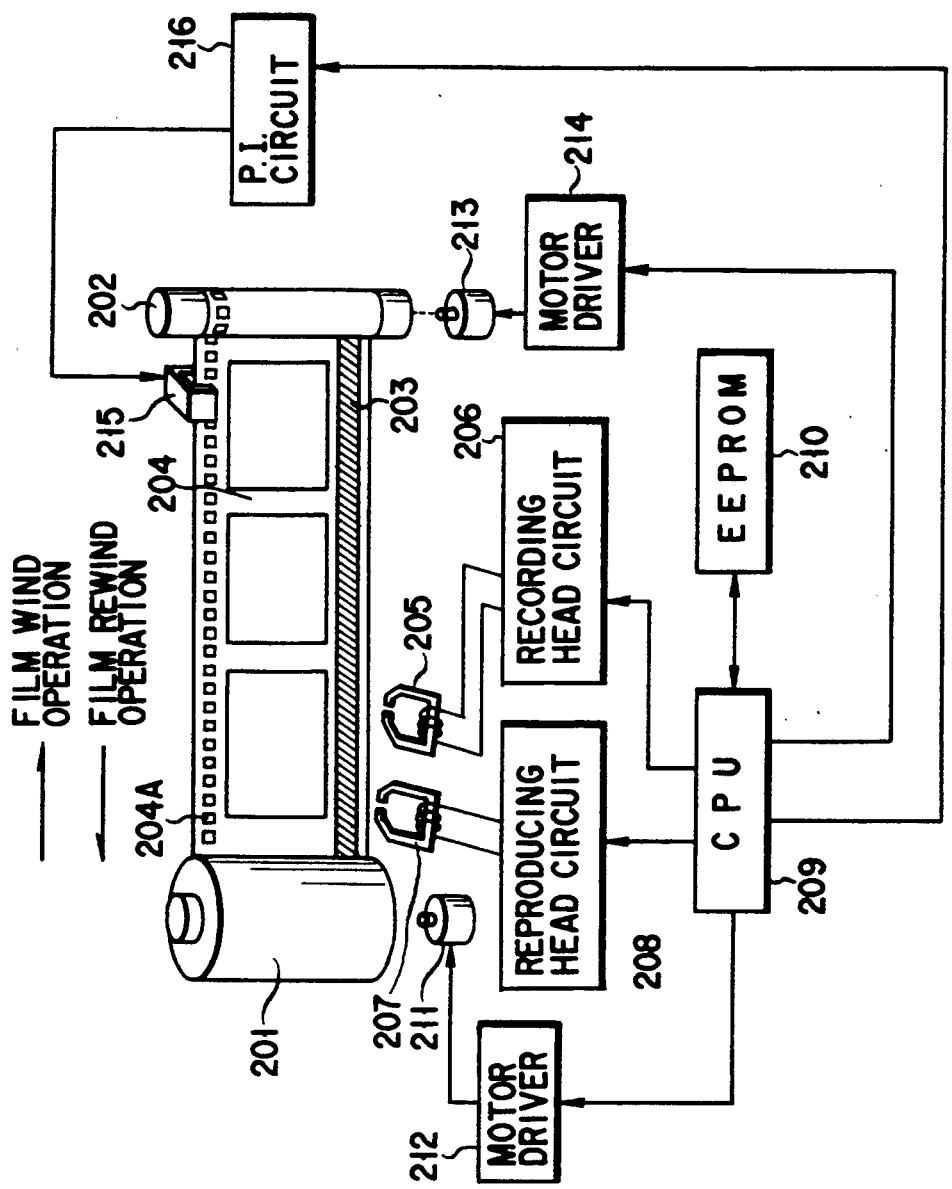
FIG. 27 is a block diagram showing the arrangement of the second embodiment of the present invention.

FIG. 27 is a block diagram showing the arrangement of the second embodiment. A camera of this embodiment comprises a film cartridge 201, a wind-up spool 202, a magnetic recording portion (magnetic track) 203 formed on a film surface, a film 204, a data recording magnetic head 205, a data recording magnetic head 205, a recording head circuit 206 for operating the data recording magnetic head 205, a data reproducing magnetic head 207, a reproducing head circuit 208 for operating the data reproducing magnetic head 207, a CPU 209, an EEPROM 210, a film rewind motor 211, a film rewind motor driver 212, a film wind motor 213, a film wind motor driver 214, a photointerrupter (P.I.) 215, and a P.I. circuit 216 for monitoring an output signal from the photointerrupter 215.

Referring to FIG. 27, perforations 204A are formed in an upper portion of the film 204, and the magnetic recording portion 203 on which data is recorded is coated on a lower portion of the film 204. Date data corresponding to the respective frames which have undergone photography are recorded on the magnetic recording portion 203 at positions immediately below the frames in one-to-one correspondence. These data are recorded on the magnetic recording portion 203 by the data recording magnetic head 205 driven by the recording head circuit 206.

Figure 28:
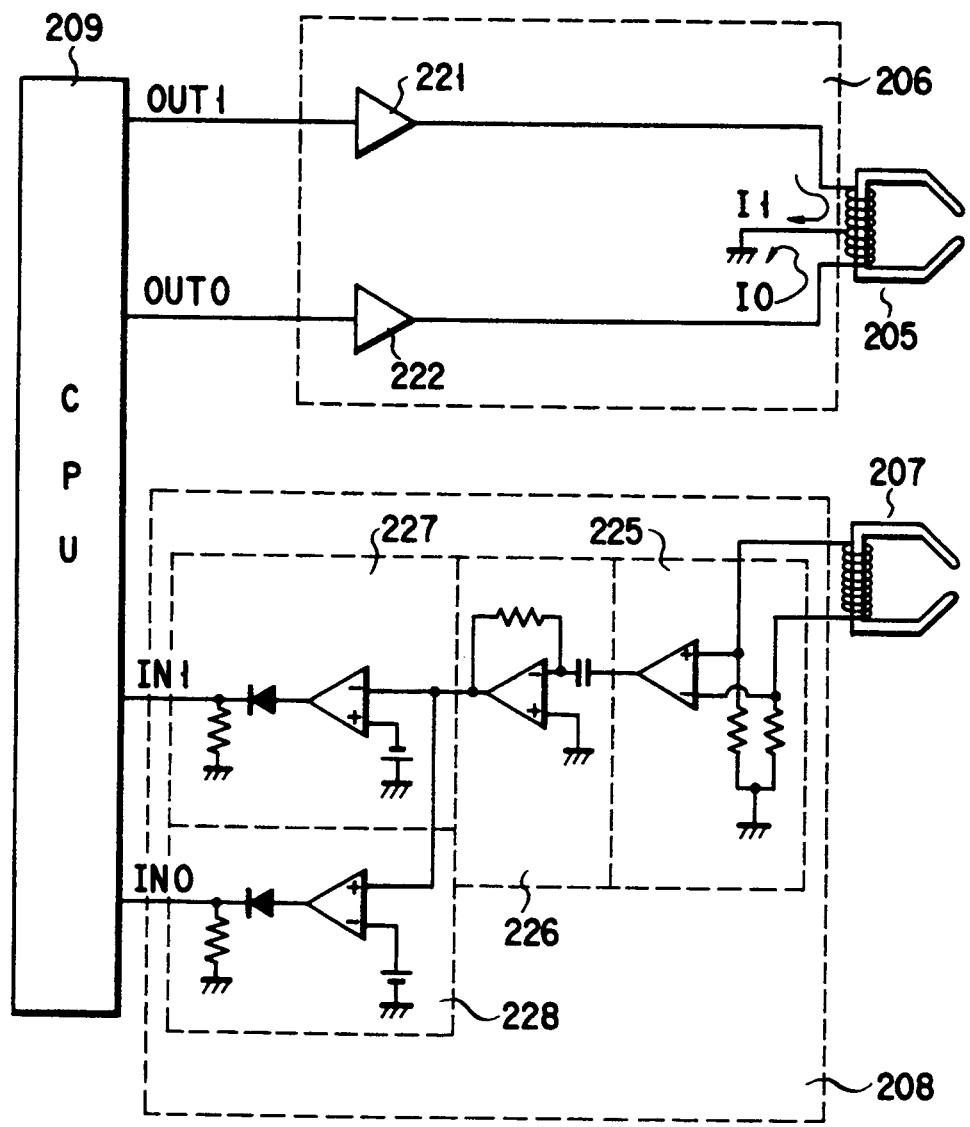
FIG. 28 is a circuit diagram showing the arrangement of a recording head circuit and a reproducing head circuit in FIG. 27.

Both a magnetic recording scheme and a reproduction scheme will be described next with reference to FIGS. 28 and 29.

In these schemes, the magnetic recording portion 203 can be set in three states, i.e., a magnetized state in the N direction, a magnetized state in the S direction, and a neutral state.

Consider a case wherein data "1" is recorded, assuming that a magnetized state in the N direction corresponds to data "1"; and a magnetized state in the south direction, data "0". When a high-level signal is output to an output port OUT1 of the CPU 209, a current $I_1$ flows in the coil of the data recording magnetic head 205 through a buffer 221. At this time, the magnetic recording portion 203 is magnetized in the N direction. In contrast to this, when data "0" is to be recorded, a high-level signal is output to an output port OUT0 of the CPU 209. As a result, a current $I_O$ flows in the coil to magnetize the magnetic recording portion 203 in the S direction. In this recording scheme, since a neutral region can be formed between bits, a distinctive boundary can advantageously be set between bit data to eliminate the necessity to use a sync clock.

In the reproduction mode, when a magnetized portion moves in front of the head 207, a magnetic field passing the head 207 changes to generate a voltage. This voltage is amplified by a head amplifier 225 (indicated by "(e)" in FIG. 29). The amplified voltage is differentiated by a differentiating circuit 226 (indicated by "(f)" in FIG. 29) and is input to comparators 227 and 228. If the recorded data is "1", the differential output becomes a negative peak, as indicated by "(f)" in FIG. 29. As a result, the output from the comparator 227 is inverted, and a high-level signal is input to an input port IN1 of the CPU 209. In contrast to this, if the recorded data is "0", the differential output becomes a positive peak. As a result, the output from the comparator 228 is inverted, and a high-level signal is input to an input port IN0 of the CPU 209.

In this manner, the recording head circuit 206 and the reproducing head circuit 208 are operated under the control of the CPU 209 in the recording and reproduction schemes, thus writing and reading date data. In this case, the date data of all frames and data indicating the ordinal numbers of the frames to which the date data respectively correspond are stored in the EEPROM 210 according to a format such as the one employed in the first embodiment. Data exchange with respect to the EEPROM 210 is performed by the CPU 209. Note that data recording is performed during a film wind operation after photography corresponding to one frame, whereas data reproduction is performed while the film is rewound into the film cartridge 201 upon completion of photography. These operations will be described in detail later.

According to the format of date data, a number is expressed by 4 bits (for example, "1" is expressed as "0001"; and "9", as "1001"), and 24 bits for "year", "month", and "day" expressed by a total of 6 numbers, each expressed by two numbers, constitute total data recorded for each frame. If, therefore, the date of photograph is "92 (year), 1 (month), 1 (day)", the date data is expressed as "1001 0010 0000 0001 0000 0001" sequentially arranged from the start position. This 24-bit data as the recorded data are sequentially read from the magnetic recording portion 203 of the film 204 through the reproducing head circuit 208.

Before this read recorded data is written in the magnetic recording portion 203 in advance, the frame count and the date data are stored in the EEPROM 210. Therefore, the film 204 can be rewound into the film cartridge 201 after the two data are compared to be checked again, and a film rewind operation is performed by the motor 211 and the film rewind motor driver 212 used for a known camera.

In this case, if the two data do not coincide with each other, another operation is performed. More specifically, if incoincidence is determined, the CPU 209 drives the data recording magnetic head 205 through the recording head circuit 206 to forcibly rewrite the magnetic data of a frame in which the incoincidence is detected. In this case, as shown in FIG. 29, when the output port OUT1 (indicated by "(a)") and the output port OUT0 (indicated by "(b)") are respectively set at high level and low level, the corresponding data is "1", whereas when the output ports OUT1 and OUT0 are respectively set at low level and high level, the corresponding data is "0". Therefore, both the output ports OUT1 and OUT0 are set at low level to record the data in a state representing neither "0" nor "1". That is, a neutral state as a magnetized state is written. With this operation, since the recorded data is neither "0" nor "1", erasure of the data is accomplished.

When this overwrite operation is completed, the film 204 is rewound into the film cartridge 201 by one frame. The CPU 209 checks the date data of all the frames, and confirms that the entire film 204 is rewound into the film cartridge 201, thus terminating the processing. In this confirming operation, the perforations 204A are counted to detect the start end of the film 204 by using the photointerrupter 215 and the P.I. circuit 216 as a signal processing circuit therefor (both circuits are used for a known camera). Provided that the view angle size of a frame is 24×36 mm, one frame can be normally detected by counting the 8 perforations 204A.

Figure 30:
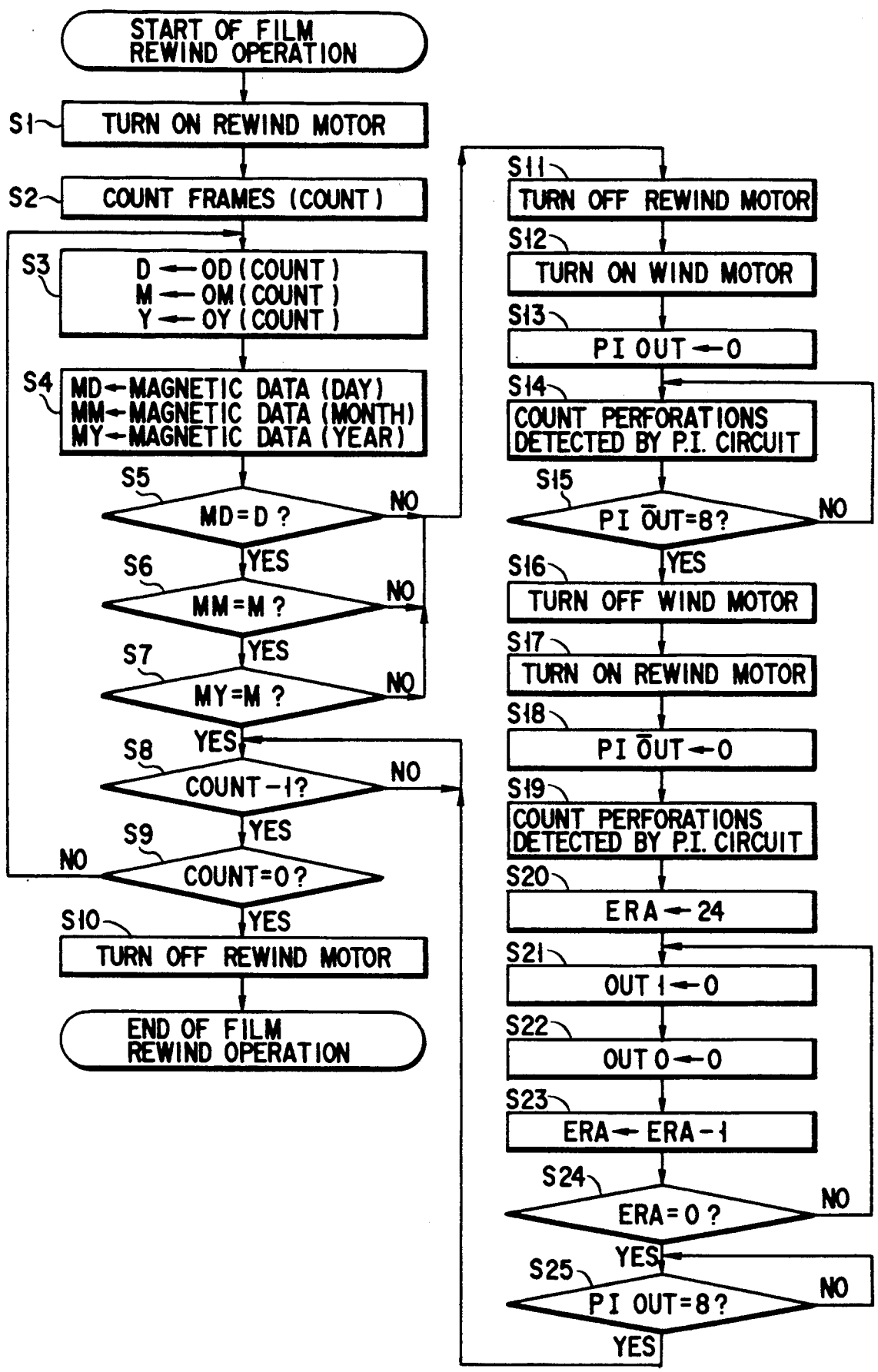
FIG. 30 is a flow chart for explaining a rewind operation.

An operation to be performed when photography is completed, and the film 204 is rewound into the film cartridge 201 will be described further in detail below with reference to the flow chart in FIG. 30 which shows the operation of the CPU 209.

When photography is completed, and rewinding of the film 204 is started, a switch is turned on to drive the film rewind motor 211 (step S1). When a film rewind operation is started, counting of the perforations 204A is started on the basis of outputs from the photointerrupter 215 (step S2). In this case, the number of the perforations 204A corresponding to one frame is eight, and one frame is detected when the eight perforations 204 are counted. At this time, the number of frames which have undergone photography is stored, as an initial value, at a code address COUNT.

Subsequently, recorded data corresponding to the code address COUNT at which the frame count is stored are sequentially read out from the EEPROM 210 in the order of original day (OD), month (OM), and year (OY) and are stored at code addresses D, M, and Y (step S3). Magnetic data is then read out from the reproducing head circuit 208 through the data reproducing magnetic head 207 (step S4). In this case, magnetic data is written during a film wind operation, while magnetic data is read during a film rewind operation. Magnetic data in a write operation are arranged in a reverse order relative to magnetic data in a read operation. For this reason, data are converted as follows. When date data representing "92 (year), 1 (month), 1 (day)" are recorded, "1001 0010 0000 0001 0000 0001" are arranged in this order from the start position. These data are reproduced and read in the order of "1000 0000 1000 0000 0100 1001". Therefore, the data read bit by bit are recognized in the reverse order and are stored in such a manner that the data corresponding to "day" of the magnetic data is stored at a code address MD, and the data corresponding to "month" and "year" of the magnetic data are respectively stored at code addresses MM and MY.

Subsequently, the date data stored in the EEPROM 210 in step S3 are compared with the date data stored as the magnetic data in step S4. More specifically, it is checked whether the data representing "day" coincide with each other (step S5). It is checked whether the data representing "month" coincide with each other (step S6). It is checked whether the data representing "year" coincide with each other (step S7). If incoincidence is determined even in one of steps S5 to S7, the flow advances to step S11. If all the data coincide with each other, the flow advances to step S8.

In step S11 to step S25, a magnetic data erase operation with respect to the detection of incoincidence is performed. More specifically, the film rewind motor 211 is turned off to stop the rewind operation (step S11). The film wind motor 213 is then turned on to return the film to a position corresponding to the start position of magnetic data corresponding to a frame in which the coincidence is detected (step S12). In order to detect a value for returning the film by one frame, a code address PIOUT is set to "0" used to count outputs from the P.I. circuit 216 (step S13). The perforations 204A detected by the P.I. circuit 216 are counted through the photointerrupter 215 (step S14). It is then checked whether the count value in step S14 is "8" (step S15). If "8" corresponding to one frame is determined, the flow advances to step S16. If the count value is less than "8", the flow advances to step S14.

If the film is wound by a frame, the film wind motor 213 is stopped (step S16). In order to erase the data in the magnetic recording portion 203, the film rewind motor 211 is turned on (step S17). In steps S18 and S19, similar to steps S13 and S14, processing is performed to detect whether the film 204 is fed by a frame. "24" is set in a code address ERA as a counter for erasing 6-character data consisting of 24 bits (step S20). As erase signals for setting a neutral state as a magnetized state, "0"s are respectively set in the output ports OUT1 and OUT2 (steps S21 and S22). A time $T_{ON}$ in FIG. 29 is determined by a film moving speed and a bit density and is normally set to be 0.2 msec. If the time $T_{ON}$ and a time $T_{OFF}$ are respectively set to be 0.2 msec and 0.8 msec, the time required for the processing in steps PS21 and S22 is 1 msec.

After the value of the code address ERA is decremented by one (step S23), it is checked whether all the 6-character data are erased (step S24). Thereafter, it is checked whether the film 204 is fed by one frame after the erase operation is completed (step S25).

If it is detected in steps S5 to S7 that the data coincide with each other, the value of the code address COUNT is decremented by one upon confirming that the film 204 is fed by one frame (step S8). It is then checked whether the film 204 is completely rewound into the film cartridge 201 (step S9). Upon confirming that the film is rewound, the film wind motor 213 is stopped to terminate the film rewind operation (step S10). If the film 204 is not completely rewound, the flow advances to step S3, and the above-described series of operations are repeated.

As described above, in the camera capable of recording/reproducing data on/from the magnetic recording portion 203, when magnetic data are not accurately recorded, inaccurate magnetic data are completely erased. Therefore, such data are not erroneously processed in a developing or printing process, and false processing can be easily prevented.

In the above-described embodiment, data recording is performed while a film is wound by one frame, and data reproduction and determination of incoincidence of data are performed during a film rewind operation. If incoincidence is determined, a data erase operation is performed during a film rewind operation after the film is wound by one frame. However, the present invention is not limited to this. For example, immediately after the film is wound by one frame, the film may be rewound by one frame to reproduce the data and erase the data upon detection of incoincidence. Data indicating incoincidence of data may be stored in the EEPROM, and the data of only frames in which incoincidence is determined may be erased after all the frames are rewound. Alternatively, this recording/reproduction/erasure may be performed during a film rewind operation. Various changes and modifications can be made within the spirit and scope of the invention.

As has been described above, according to the second embodiment of the present invention, there is provided a camera which can prevent false processing based on incomplete data processing in a developing or printing process.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A magnetic recording apparatus for a camera using a film with a magnetic recording portion, comprising:
   magnetic recording means for recording photographic data on a predetermined position of said magnetic recording portion when said film is wound after photography corresponding to one frame is completed;
   electrically erasable nonvolatile storage means for storing the photographic data after the photography corresponding to one frame is completed;
   magnetic reproducing means for reproducing the photographic data recorded on said magnetic recording portion while said film is rewound;
   determining means for determining whether the photographic data reproduced by said magnetic reproducing means coincides with the photographic data stored in said storage means; and
   re-recording means for causing said magnetic recording means to re-record the photographic data, stored in said storage means, on the predetermined position of said magnetic recording portion when said determining means determines that the two photographic data do not coincide with each other.

2. An apparatus according to claim 1, wherein said magnetic recording means records data according to a Non Return to Zero Change to 1 scheme.

3. An apparatus according to claim 1, wherein said magnetic recording means records redundant data on at least one of before and behind positions of the predetermined position of said magnetic recording portion when the photographic data is recorded.

4. An apparatus according to claim 1, further comprising moving speed detecting means for detecting a moving speed of said film when said film is wound, so that recording of the photographic data is started when it is determined that a moving speed, of said film, detected by said moving speed detecting means is higher than a predetermined speed.

5. An apparatus according to claim 1, wherein said magnetic recording means records a numeric code of the photographic data and a character code representing the numeric code, and said storage means stores only the numeric code.

6. An apparatus according to claim 5, wherein said storage means includes an electrically erasable nonvolatile memory.

7. An apparatus according to claim 1, wherein when said magnetic reproducing means reproduces the photographic data corresponding to one byte while said film is rewound, said determining means performs determination by using the photographic data corresponding to a reproduced photographic frame and stored in said storage means.

8. An apparatus according to claim 7, wherein said magnetic recording means records a numeric code of the photographic data and a character code representing the numeric code, said storage means stores only the numeric code, and said determining means compares only the two numeric codes with corresponding data.

9. An apparatus according to claim 1, further comprising means for, when the photographic data re-recorded by said re-recording means is reproduced by said magnetic reproducing means, inhibiting said re-recording means from performing re-recording of the photographic data again if said determining means determines that the two photographic data do not coincide with each other.

10. An apparatus according to claim 1, further comprising display means for displaying a warning when said determining means determines that the two data do not coincide with each other.

11. An apparatus according to claim 1, wherein said magnetic recording means records data having greater importance preferentially in recording the photographic data.

12. An apparatus according to claim 11, wherein said magnetic recording means records data representing a "hour" and "minute" of the photographic data in preference to a "month" and "day".

13. A magnetic recording apparatus for a camera using a film with a magnetic recording portion, comprising:
    magnetic head means for recording/reproducing data on/from a predetermined position of said magnetic recording portion of said film;
    magnetic data control means for controlling the recording/reproducing operation of said magnetic head means;
    motor control means for controlling motors for winding and rewinding said film;
    movement detecting means for detecting movement of said film when said film is wound;
    electrically erasable nonvolatile storage means for storing at least a part of the data; and
    microcomputer means for controlling said magnetic recording apparatus for said camera, said microcomputer means causing said storage means to store photographic data, causing said motor control means to wind said film, and causing said magnetic head means through said magnetic data control means to record the photographic data on said magnetic recording portion at a timing in accordance with an output from said movement detecting means after a photographic operation corresponding to one frame of said film is completed, receiving the photographic data reproduced by said magnetic head means and the photographic data stored in said storage means to determine whether the two photographic data coincide with each other when said film is rewound, and causing said magnetic head means through said magnetic data control means to re-record the photographic data on said magnetic recording portion if incoincidence is determined.

14. An apparatus according to claim 13, wherein said magnetic head means records the data according to a Non Return to Zero Change to 1 scheme through said magnetic data control means.

15. An apparatus according to claim 13, wherein said magnetic head means records redundant data on at least one of before and behind of the predetermined position of said magnetic recording portion through said magnetic data control means when the photographic data is recorded.

16. An apparatus according to claim 13, wherein said microcomputer means causes said magnetic head means through said magnetic data control means to start recording the photographic data when it is determined that a moving speed of said film in accordance with the output from said movement detecting means is higher than a predetermined speed.

17. An apparatus according to claim 13, wherein said microcomputer means transmits a numeric code of the photographic data and a character code representing the numeric code to said magnetic data control means, and causes said storage means to store only the numeric code.

18. An apparatus according to claim 15, wherein said storage means device includes an electrically erasable and programmable read only memory.

19. An apparatus according to claim 13, wherein when said magnetic head means through said magnetic data control means reproduces the photographic data corresponding to one byte while said film is rewound, said microcomputer means performs determination by using photographic data corresponding to a reproduced photographic frame and stored in said storage means.

20. An apparatus according to claim 19, wherein said magnetic head means through said magnetic data control means records a numeric code of the photographic data and a character code representing the numeric code, said storage means stores only the numeric code, and said microcomputer means compares only the two numeric codes with corresponding data.

21. An apparatus according to claim 19, wherein said microcomputer means causes said magnetic head means through said magnetic data control means to reproduce the re-recorded photographic data, compares reproduced photographic data with the photographic data stored in said storage means, and inhibits said magnetic head means through said magnetic data control means from re-recording the photographic data again if it is determined that the two photographic data do not coincide with each other.

22. A magnetic recording apparatus for a camera using a film with a magnetic recording portion, comprising:
  magnetic recording means for recording photographic data on said magnetic recording portion when said film is wound after photography corresponding to one frame is completed;
  storage means for storing the photographic data after the photography corresponding to one frame is completed;
  magnetic reproducing means for reproducing the photographic data recorded on said magnetic recording portion while said film is rewound;
  determining means for determining whether the photographic data reproduced by said magnetic reproducing means coincides with the photographic data stored in said storage means; and
  erasing means for erasing recorded data while the film is wound by one frame, when said determining means determines that the two photographic data do not coincide with each other.

23. An apparatus according to claim 22, wherein said magnetic recording means records photographic data on said magnetic recording portion by using three magnetized states including magnetized states in N and S directions and a neutral state.

24. A magnetic recording apparatus for a camera using a film with a magnetic recording portion, comprising:
  magnetic recording means for recording photographic data on said magnetic recording portion;
  storage means for storing the photographic data recorded by said magnetic recording means;
  magnetic reproducing means for reproducing the photographic data recorded by said magnetic recording means;
  comparing means for comparing the photographic data reproduced by said magnetic reproducing means with the photographic data stored in said storage means; and
  incoincidence processing means for, when said comparing means detects incoincidence between the two photographic data, processing the photographic data recorded on said magnetic recording portion in which the incoincidence is detected, wherein said incoincidence processing means causes said magnetic recording means to re-record the photographic data on said magnetic recording portion.

25. An apparatus according to claim 24, wherein said incoincidence processing means causes said magnetic recording means to erase the photographic data recorded on said magnetic recording portion.

26. An apparatus according to claim 24, wherein said incoincidence processing means displays occurrence of incoincidence.

27. An apparatus according to claim 26, wherein said incoincidence processing means displays a frame in which incoincidence has occurred.

28. An apparatus according to claim 24, wherein said magnetic recording means records the photographic data on said magnetic recording portion while said film is wound after photography corresponding to one frame is completed.

29. An apparatus according to claim 24, wherein said comparing means executes comparison while said film is rewound after completion of all photography with respect to said film.

30. An apparatus according to claim 29, wherein said comparing means executes comparison with respect to the photographic data corresponding to one frame at a time when said film is rewound by one frame.

31. An apparatus according to claim 29, wherein said storage means stores the photographic data as compressed data.

32. An apparatus according to claim 31, wherein said storage means stores the photographic data upon compressing the data by selecting only numeric data from the photographic data.

33. An apparatus according to claim 31, wherein said storage device includes an electrically erasable and programmable read only memory.

34. A camera using a photosensitive film having a magnetic recording portion, comprising:
  a camera body;
  film feed means, mounted in said camera body, for feeding said film;
  magnetic recording means for recording data on said magnetic recording portion on said film;
  magnetic reproducing means for reproducing data from said magnetic recording portion on said film;
  data creating means for creating data unique to a frame in response to a photographic operation with respect to the frame;
  nonvolatile storage means for storing data created by said data creating means;
  recording control means for causing said magnetic recording means to record the data created by said data creating means on said magnetic recording portion on said film while said film is wound by said film feed means after a photographic operation is completed;

reproduction control means for causing said magnetic reproducing means to reproduce the data recorded on said magnetic recording portion while said film is rewound by said film feed means after completion of all photography with respect to said film;

determining means for, when data, of each frame, reproduced by said reproducing means and corresponding data stored in said nonvolatile storage means do not coincide with each other, determining that the data is not properly recorded on said magnetic recording portion on said film; and auxiliary means for executing an operation corresponding to a recording error when said determining means determines that the data is not properly recorded.

35. A camera according to claim 34, wherein said auxiliary means includes means for temporarily stopping a rewind operation of said film, and executing a recording operation with respect to a corresponding frame again.

36. A camera according to claim 34, wherein said auxiliary means includes means for displaying a warning that the data is not properly recorded on said magnetic recording portion on said film.

37. A camera according to claim 34, wherein said auxiliary means includes means for temporarily stopping a rewind operation of said film, and erasing false data recorded on a corresponding frame.

38. A camera in which a photosensitive film having a magnetic recording portion can be mounted therein, comprising:

a camera body;

film feed means, mounted in said camera body, for feeding said film; magnetic recording means for operating said film feed means and recording photographic data of each frame on said magnetic recording portion on said film in synchronism with movement of said film; and determining means for determining whether the photographic data of each frame is properly recorded on said magnetic recording portion of said film, said determining means including:

storage means for storing photographic data for all frames;

reproducing means for operating said film feed means and reproducing data recorded on said magnetic recording portion on said film in synchronism with movement of said film, said reproducing means and said magnetic recording means including a single common magnetic head; and comparing means for, when the reproduced data and the photographic data stored in said storage means do not coincide with each other, determining that the photographic data of each of the frames is not properly recorded on said magnetic recording portion of said film.

39. A camera according to claim 38, further comprising means for, when it is determined that the photographic data for each frame is not properly recorded on said magnetic recording portion of said film, executing a re-recording operation or an erase operation with respect to a corresponding frame.

40. A camera according to claim 38, further comprising means for executing a warning operation when it is determined that the photographic data of each of the frames is not properly recorded on said magnetic recording portion of said film.

41. A magnetic recording apparatus for a camera using a film having a magnetic recording portion, comprising:

magnetic recording means for recording data on said magnetic recording portion while said film is wound;

magnetic reproducing means for reproducing the data recorded by said magnetic recording means while said film is rewound after completion of all photography with respect to the film;

determining means for determining whether the data reproduced by said magnetic reproducing means is correct; and processing means for performing predetermined processing when said determining means determines that there is an error in the reproduced data.

42. An apparatus according to claim 41, wherein said processing means causes said magnetic recording means to re-record the data on said magnetic recording portion.

43. An apparatus according to claim 41, wherein said processing means causes said magnetic recording means to erase the data having the error on said magnetic recording portion.

44. An apparatus according to claim 41, wherein said processing means displays a recording error in the data.

45. A camera using a photosensitive film having a data recording portion, comprising:

a camera body;

recording means, mounted in said camera body, for recording data unique to each photographic frame on said data recording portion while moving said film;

reproducing means for reproducing the data recorded on said recording portion, at a predetermined timing after the recording operation by said recording means is completed for all frames, while moving said film; and check means for checking a recording error in the data reproduced by said reproducing means.

46. An apparatus according to claim 45, wherein said recording means operates while said film is wound by one frame after a photographic operation is completed.

47. An apparatus according to claim 45, wherein said reproducing means operates while a film rewind operation is performed.

48. A magnetic data recording method for a camera in which a film having a magnetic recording portion can be mounted therein, comprising the steps of:

recording data unique to each photographic frame on said magnetic recording portion while said film is wound;

reproducing the data recorded on said magnetic recording portion while said film is rewound after completion of all photography with respect to the film; and checking the presence/absence of a recording error in accordance with a reproduction result.

* * * * *